United States Patent
Evans et al.

(10) Patent No.: US 8,024,382 B2
(45) Date of Patent: Sep. 20, 2011

(54) DYNAMIC MANIPULATION OF ARCHIVE FILES

(75) Inventors: Garrick D. Evans, San Francisco, CA (US); Liang Han, Shanghai (CN); Carolyn E. Kreisel, Trumansburg, NY (US); Tong Zhang, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 405 days.

(21) Appl. No.: 12/356,444

(22) Filed: Jan. 20, 2009

(65) Prior Publication Data
US 2010/0185690 A1 Jul. 22, 2010

(51) Int. Cl.
*G06F 12/00* (2006.01)
*G06F 17/30* (2006.01)
*G06F 7/00* (2006.01)
*G06F 17/00* (2006.01)

(52) U.S. Cl. ........................ 707/821; 707/661

(58) Field of Classification Search .......... 707/821, 707/661
See application file for complete search history.

(56) References Cited

U.S. PATENT DOCUMENTS

| | | | |
|---|---|---|---|
| 5,790,848 A * | 8/1998 | Wlaschin | 707/661 |
| 6,522,268 B2 * | 2/2003 | Belu | 341/51 |
| 7,739,241 B2 * | 6/2010 | Boutcher | 707/640 |
| 7,818,498 B2 * | 10/2010 | Hitz et al. | 711/114 |
| 2002/0042833 A1 * | 4/2002 | Hendler et al. | 709/231 |
| 2005/0120234 A1 * | 6/2005 | Peterson | 713/193 |
| 2006/0020645 A1 * | 1/2006 | Hasegawa et al. | 707/204 |
| 2007/0043753 A1 * | 2/2007 | Basin et al. | 707/101 |

OTHER PUBLICATIONS

APPNOTE.TXT version 6.3.2, Revised Sep. 28, 2007, copyright 1989-2007 PKWARE Inc., 57 pages.

* cited by examiner

*Primary Examiner* — Charles E Lu
(74) *Attorney, Agent, or Firm* — Gates & Cooper LLP

(57) ABSTRACT

A method, apparatus, and article of manufacture provide the ability to edit in-place a ZIP™ archive file. A file and a first file block (FFB) in a first block location are opened and modified. If the first block location can accommodate the modified FFB, the modified FFB is saved, in-place, in the first block location without rewriting the entire archive. However, if the first block location cannot accommodate the modified FFB, a second file block is copied from a second block location to a third block location located at an end of a file data section of the archive. A portion of the second block location is marked as a free block and the modified FFB is saved without rewriting the entire ZIP™ archive. The archive is then saved by updating and saving both the central directory and end of central directory.

22 Claims, 14 Drawing Sheets

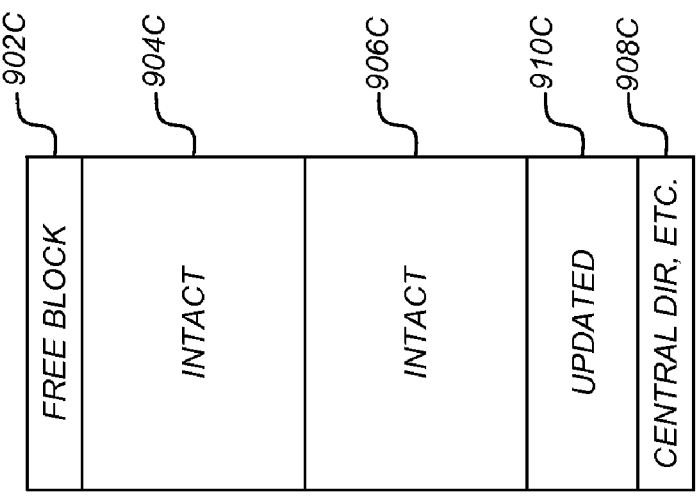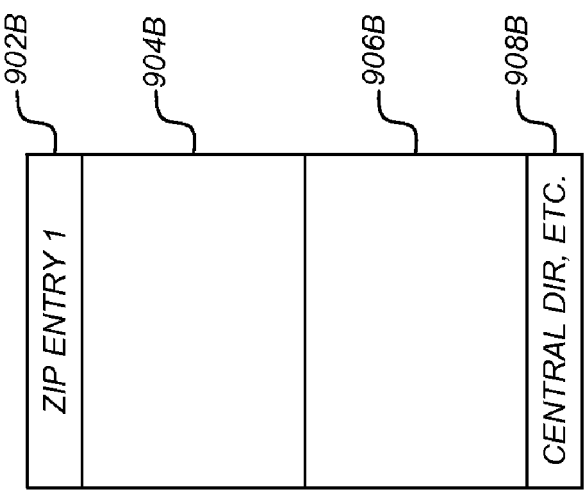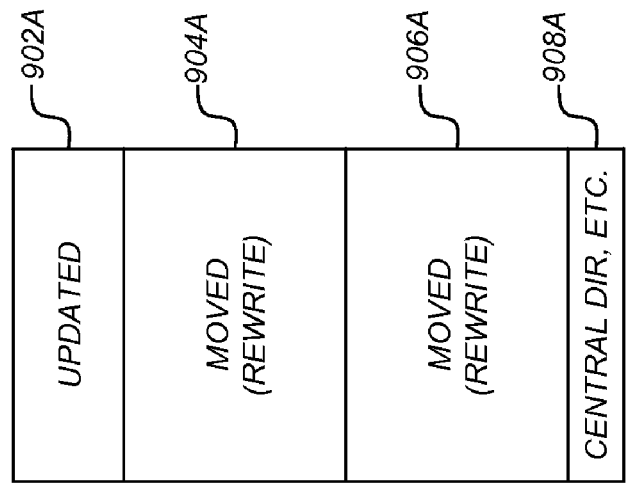

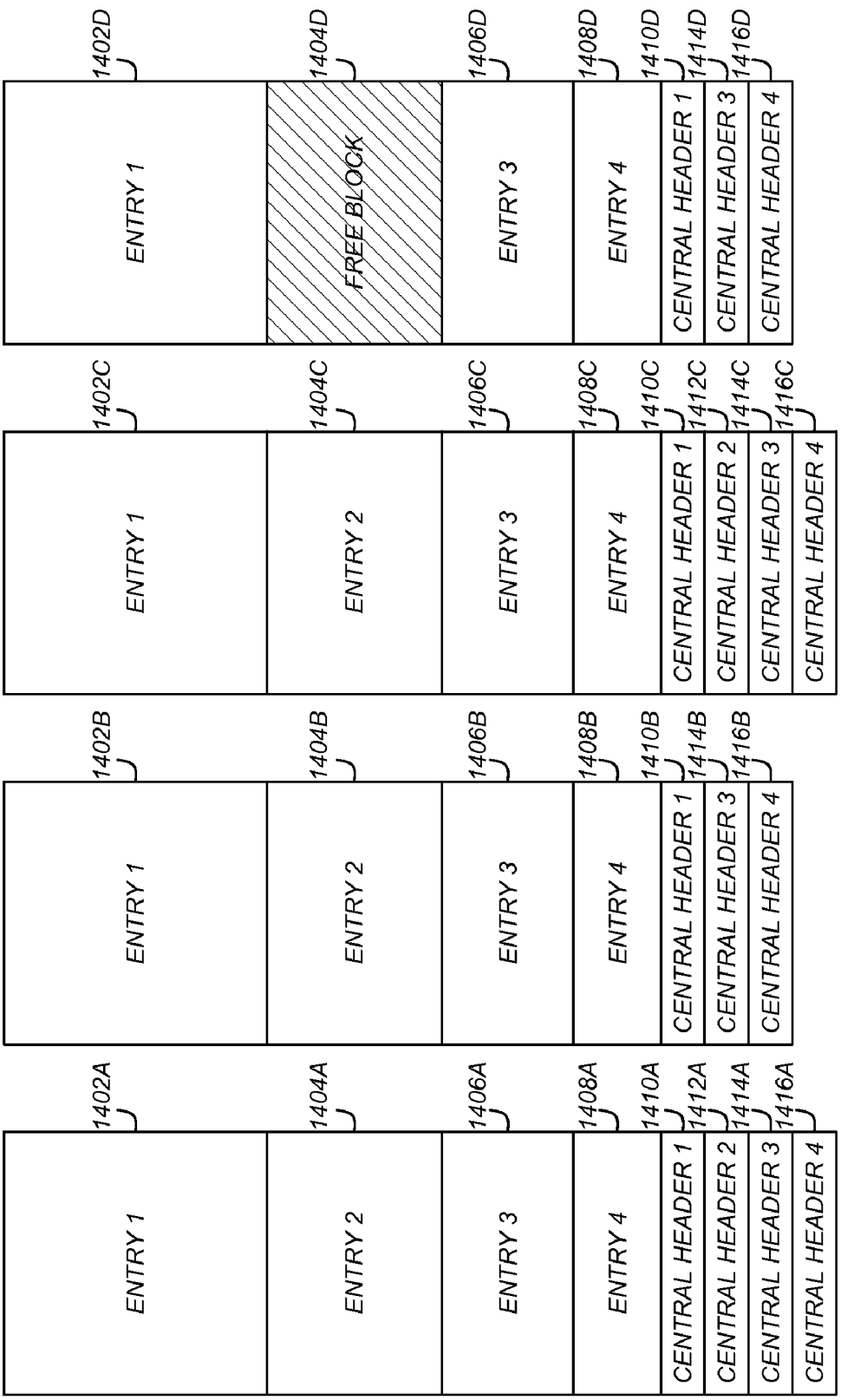

DYNAMIC MANIPULATION OF ARCHIVE FILES

BACKGROUND OF THE INVENTION

1. Field of the Invention

The present invention relates generally to ZIP™ archive files, and in particular, to a method, apparatus, and article of manufacture for the dynamic manipulation of ZIP™ archive files supporting efficient read-write access for in-place editing, growth, defragmentation and recoverable deletion.

2. Description of the Related Art

Files and folders can consume a considerable amount of memory and storage. The electronic transmission of large files and folders can be slow based on the limited bandwidth of the available transmission medium. Additionally, it is often desirable to archive files and folders. To overcome such size and transmission constraints as well as to support archiving, files and folders are often compressed and/or stored in an archival format. The ZIP™ file format is one such data compression and archival format. However, in the prior art, when any file stored in a ZIP™ file has been edited, the entire file must be rewritten. Accordingly, there is a limited capability and aversion to performing any read-write manipulation of an interior file or subsection of data within an archive. These problems may be better understood with an explanation of the ZIP™ specification and prior art solutions.

Fundamentally, the ZIP™ specification describes a delimited linear arrangement of embedded files each preceded by an informational header and the whole file suffixed by a central directory or table of contents. Such a format is a convenient read-only, write-once archive suitable for collecting hierarchies of files and folders. However, this design does not lend itself well for read-write manipulation of any interior file or subsection of data within. Traditionally, such limitations have been overlooked or left unchallenged as the format has primarily been used as an archival mechanism. Increasingly though, applications are venturing into using openly accessible multi-part formats such as ZIP for native data storage. It is not new that application files are of this nature but the open ZIP format is becoming (if it has not already become) the de facto standard for such implementations. The appeal is that a multitude of free and for-fee applications and libraries exist for reliably manipulating file archives of this format. The specification is open and available and source code exists in the public domain for reference and usage.

In view of the above, some prior art products either do not use ZIP™ files for native data storage and instead write custom solutions, use structured storage (e.g., Microsoft™ structured storage) or simply rewrite the entire archive file with every change. However, such solutions are limited and inflexible.

FIG. 1 illustrates the overall structure of the ZIP format. The local file headers 102/102N provide information relating to the file data 104/104N that consists of the actual compressed file or stored data for the file. The series of local file header 102/102N, file data 104/104N, and data descriptor 106/106N repeats for each file 104/104N in the ZIP archive. The data within the local file headers 102/102N consists of a local file header signature, the version needed to extract the data, a general purpose bit flag, the compression method, the last modified file date and time, the 32 bit checksum CRC32, the compressed size, the uncompressed size, the file name length, and the file name.

The data descriptors 106/106N exists only if bit 3 of the general purpose bit flag is set. It is byte aligned and immediately follows the last byte of compressed data. This descriptor is used only when it was not possible to seek in the output .ZIP file, e.g., when the output .ZIP file was standard output or a non-seekable device. For ZIP64™ format archives, the compressed and uncompressed sizes are 8 bytes each. It includes a 32-bit checksum value to detect the accidental alteration of data during transmission or storage, the compressed and uncompressed sizes of the file data 104/104N.

The archive decryption header 108 is part of the ZIP archive strong encryption scheme and precedes an encrypted data segment (i.e., the archive extra data record 110 and the encrypted central directory structure data 112). The archive decryption header 108 contains information relating to the encryption of the encrypted data segment 110/112 including an encryption algorithm identifier, a bit length of the encryption key, processing flags needed for decryption, etc.

The archive extra data record 110 is part of the ZIP archive strong encryption scheme, immediately precedes the central directory data structure 112 and provides a signature, an extra field length, and extra field data that is used as part of the strong encryption scheme.

The central directory structure 112 consists of a series of file headers that provide the relative offset of each local file header 102/102N as follows:

[file header 1]

[file header n]

Each file header in the central directory contains versioning information, modification date and times, compression information (for the file header), the compressed and uncompressed file sizes (i.e., of the file data 104/104N), various fields and their lengths (including a file name, extra field and file comment) as well as various file attributes. Lastly, the central directory contains the relative offsets of the local file headers 102/102N.

The ZIP™64 End of Central Directory Record 114 includes versioning information (for extraction of the file data 104/104N), the total number of entries in the central directory, the size of the central directory, and the offset of the start of the central directory.

The ZIP™64 End of Central Directory Locator 116 provides the location (i.e., the relative offset) of the ZIP™64 End of Central Directory Record 114.

The End of Central Directory Record 118 provides the total number of entries in the central directory, the size of the central directory, and the offset of the start of the central directory.

In view of the above, it can be seen, that the location of a file 104/104N is indicated in the central directory 112 which is located at the end of the ZIP™ file. In this regard, each file data 104/104N is introduced by a local header with information such as the comment, file size, and file name. The central directory 112 consists of the headers holding the relative offset of the local headers 102/102N for each file. The end of central directory information 114-118 (which is at the very end of the ZIP™ file) provides the information (i.e., offset) to find the beginning of the central directory 112 so that local file header information 102/102N can be retrieved from the central directory 112.

As can be seen, the above described structure provides a convenient read-only, write-once archive suitable for collecting hierarchies of files and folders. However, there is no capability to modify the ZIP™ file without writing the file from start to finish. In this regard, every time a ZIP™ file is modified, the entire ZIP™ file is required to be rewritten. What is needed is the capability to easily and efficiently perform in-place editing of a ZIP™ file while complying with the ZIP™ file format specification (which is set forth in "APPNOTE.TXT—ZIP File Format Specification, Version 6.3.2, Sep. 28, 2007, by PKWare, Inc." which is fully incorporated by reference herein).

SUMMARY OF THE INVENTION

One or more embodiments of the invention build, maintain and leverages a free-block list, where a block is characterized as interior (ZIP™ local) files, such that space allocated to the ZIP™ archive may best be leveraged for efficient use and reuse. Blocks can be valid files or "dead zones" invisible to archive directory. Allocated block space may be reused for other blocks to maximize allocation commitment data saturation.

Embodiments further allow for a ZIP™ archive to be accessed in a read-write fashion such that ranges of bytes (data strides) may be queried, decompressed, modified, recompressed and stored without incurring a rewrite of the entire file. In this regard, two different modes—an append mode, and an automatic growth/reclamation mode may be available.

In the append mode, modified blocks are appended to the file stream rather than being manipulated in pre-allocated space. Such a configuration supports efficient "in-place" growth of data by eliminating the need to rebuild the entire file. This process leaves orphaned "free" blocks in the archive stream that may be reclaimed at a later time.

In automatic growth/reclamation mode, all blocks are subject to consideration by the algorithm for relocation within the allocation commitment (of the archive file stream). Free blocks may be reclaimed to optimize allocation and minimize unused space. New blocks may be appended to the end of the stream to satisfy growth commitments. Such a configuration eliminates the need to rewrite the file entirely, instead leveraging random access to modify the data stream.

Accordingly, embodiments of the invention allow ZIP™ archived data to be "undeleted" in whole or in part. As the archive grows "in place", it is possible that data blocks are simply abandoned in the archive. These blocks are tracked and can be recovered. If all of the blocks that compose the logical archived file are in existence, the entire data can be recovered.

Further, embodiments can dynamically determine the need for either ZIP32™ or ZIP64™ specification compliance and automatically modify the internal file structure to ensure said compliance. ZIP32™ is the traditional and most widely support specification set but is constrained by the 32-bit address space. ZIP64™ uses a full 64-bit address space and may at times be required to correctly describe the contents of the archive. The combination of the data blocking and dynamic determination of data content provides the ability to author archive files using either strategy. Embodiments may also leverage the 32-bit deflate/inflate algorithms for all data regardless of the specification compliance.

In addition, embodiments of the invention are performed within the constraints of the ZIP™ specification such that any and all ZIP™ files produced are valid.

BRIEF DESCRIPTION OF THE DRAWINGS

Referring now to the drawings in which like reference numbers represent corresponding parts throughout:

FIGS. 9A, 9B, and 9C illustrate the prior art write process, the original ZIP™ archive to be updated, and the append mode for updating an entry in place in accordance with one or more embodiments of the invention;

FIGS. 14A, 14B, 14C, and 14D illustrate the format of an original archive, after the soft deletion of a first entry, after the recovery of the first entry, and after a hard deletion of the entry respectively in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 2:
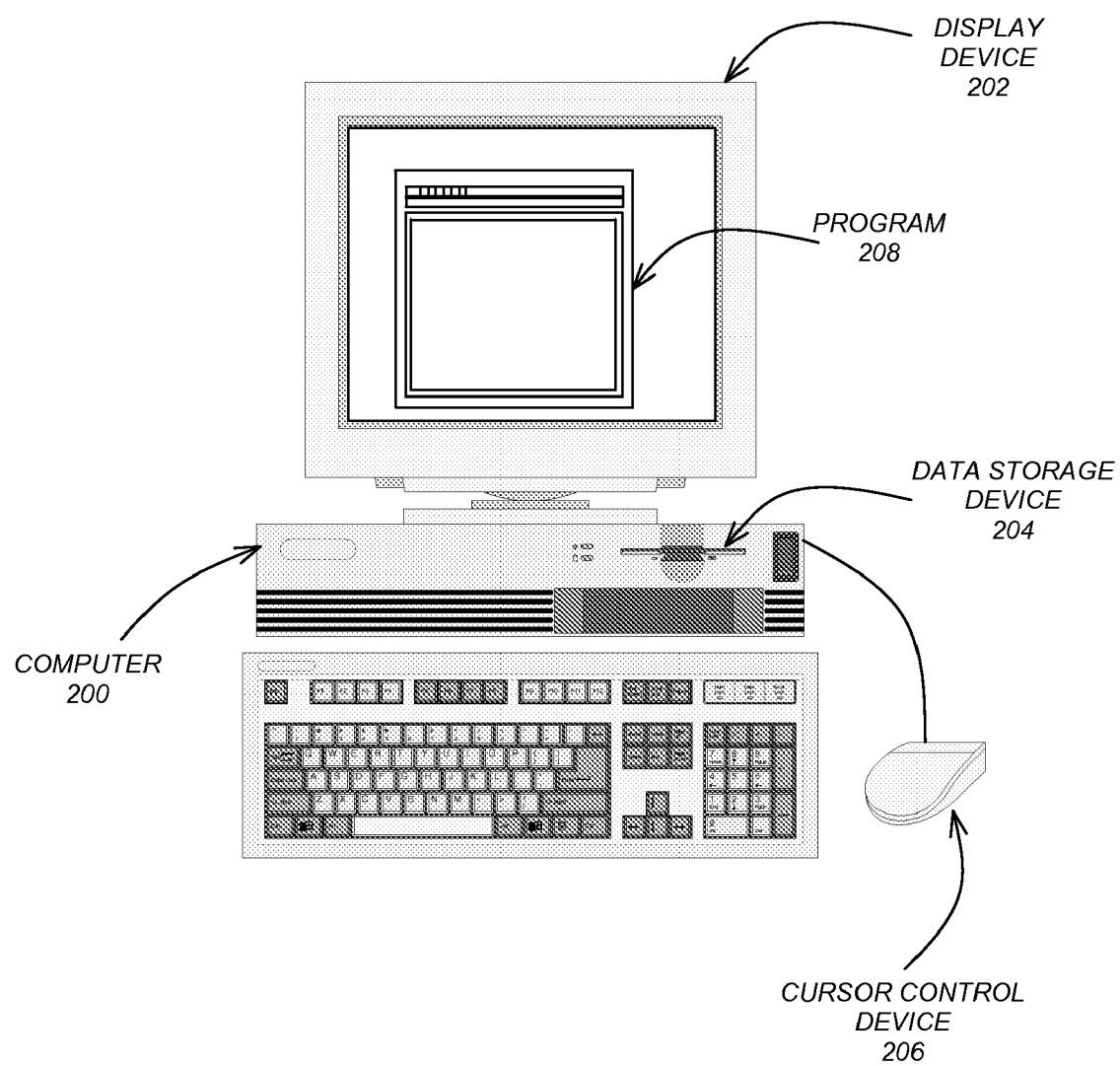
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200.

One or more embodiments of the invention are implemented by a computer-implemented program 208, wherein the program 208 is represented by a window displayed on the display device 202. Generally, the program 208 comprises logic and/or data embodied in, or readable from a device, media, carrier, or signal, e.g., one or more fixed and/or removable data storage devices 204 connected directly or indirectly to the computer 200, one or more remote devices coupled to the computer 200 via a data communications device, etc.

In one or more embodiments, instructions implementing the program 208 are tangibly embodied in a computer-readable medium, e.g., data storage device 204, which could include one or more fixed or removable data storage devices, such as a zip drive, floppy disc drive, hard drive, CD-ROM drive, DVD drive, tape drive, etc. Further, the program 208 is comprised of instructions which, when read and executed by the computer 200, causes the computer 200 to perform the steps necessary to implement and/or use the present invention. Program 208 and/or operating instructions may also be tangibly embodied in a memory and/or data communication devices of computer 200, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 2 is not intended to limit the present invention. Indeed, those skilled in the art will recognize that other alternative environments may be used without departing from the scope of the present invention.

Structural Overview

One or more embodiments of the invention implement a program 208 in the form of a compression or archive application that enables in-place editing of ZIP™ files. To provide such capabilities and to overcome the disadvantages of the prior art, embodiments of the invention utilize the concept of a logical data block where different ZIP™ archive data sections are abstracted as different type of blocks. As used herein, a block is a logical representation of a physical file segment, and has one or more of the following attributes which combined together can identify a block: block offset, block size, block dirty flag, and block types. The different block types may include a local file block, and indexing/metadata block, and a raw data block.

Local File Block

A local file block is a logical representation of a ZIP™ [archive] entry. Mapped to physical storage, a local file block includes the local file header 102/102N, local file data 104/104N, and local file descriptor 106/106N (if provided). Note that for local file data 104/104N, the local file block is virtually linked to the data by recording the attributes of the data, such as start offset and length, dirty state, and so forth instead of maintaining an entire copy of the data in memory. A local file block has the same signature as the ZIP™ local file header (0x04034b50) 102/102N.

Indexing/Metadata Block

An indexing block (also referred to as a metadata block) doesn't contain any ZIP™ entry data. Instead, an indexing block serves the sole purpose as indexes to local file blocks. These blocks may represent various blocks from the ZIP64™ or ZIP32™ format and may include a central directory block 112, end of central directory block 118, ZIP64™ end of central directory block 114, and/or ZIP64™ end of central directory locator block 116. Among these block types, the central directory block 112 and the end of central directory block 118 are applicable for both ZIP32™ and ZIP64™ archive format; the ZIP64™ end of central block 114 and ZIP64™ end of central directory locator block 116 are only applicable to the ZIP64™ archive format. Each index block has the same signature of a corresponding zip header 102/102N. For example, the signature of the central directory block 112 has the same signature of the ZIP™ central directory file header (0x02014b50) (also referred to as the archive decryption header 108).

Raw Data Block

A raw data block is a block which is neither a local file block, nor an indexing block. A raw block isn't registered with the indexing information (offsets) in indexing blocks; in other words, a raw block is isolated—a "dead zone"—that is completely hidden from a ZIP™ implementation which uses indexing blocks as the only authorized source for locating blocks. A raw block can have a signature or not, since the algorithm to discover a raw block doesn't depend on the signature. In implementation, for convenience, 4 bytes may be reserved as a raw block signature, and another 8 bytes to store the block size value as follows (the signature is 0x02014c48):

---
Header: 12 bytes (4 byte signature + 8 byte block size)
Block data

---

Given the special signature, the implementation might not need to consult the free block list for finding free blocks. For example, at the end offset of a local file block, implementation can "peek" next 4 bytes, if it's equal to the raw data block signature, then it's safe to draw the conclusion that a raw data block is following the current local file block. Such an implementation may be useful for in place editing because a local file block can decide in this simple way whether or not there are some growth spaces immediately after it, without looking up the free block list previously built by the dynamic free block locating algorithm as described in further detail below. However, a free block list may also be maintained and cached.

One note here is that since the minimum block size for a raw block with signature may be 12 bytes or more; this implies not all orphaned blocks can be marked this way. For example, a block with only two (2) bytes doesn't have enough space for a signature to fit in. For these small blocks, a search of the invention may still find the small blocks, and one or more implementations can defragment pieces of these blocks by moving and merging them together to achieve better space usage efficiency.

Infrastructure

With the concept of block, an infrastructure that can manage the blocks is useful. Embodiments of the invention utilize a ZIP™ object model, which is a virtual file system laying on top of the physical ZIP™ archive. This virtual file system is I/O agnostic as it operates on top of a generic stream model which only requires implementations of stream concepts, like read, write, seek, etc. The implementation is free to choose different existing IO mechanisms, like basic C input output, std iostream, memory mapped files, etc. to implement the stream concepts Block Processing Load Process of Blocks As described above, various blocks are used in the ZIP™ file. Some of the blocks (i.e., local file blocks) are indexed (i.e., via the central directory or indexing blocks stored in the central directory) while others (i.e., raw data blocks) are not. To properly address and establish the ZIP™ capabilities of embodiments of the invention, the various blocks may initially be loaded. This loading process essentially establishes the structure of the file system to be used.

Figure 1:
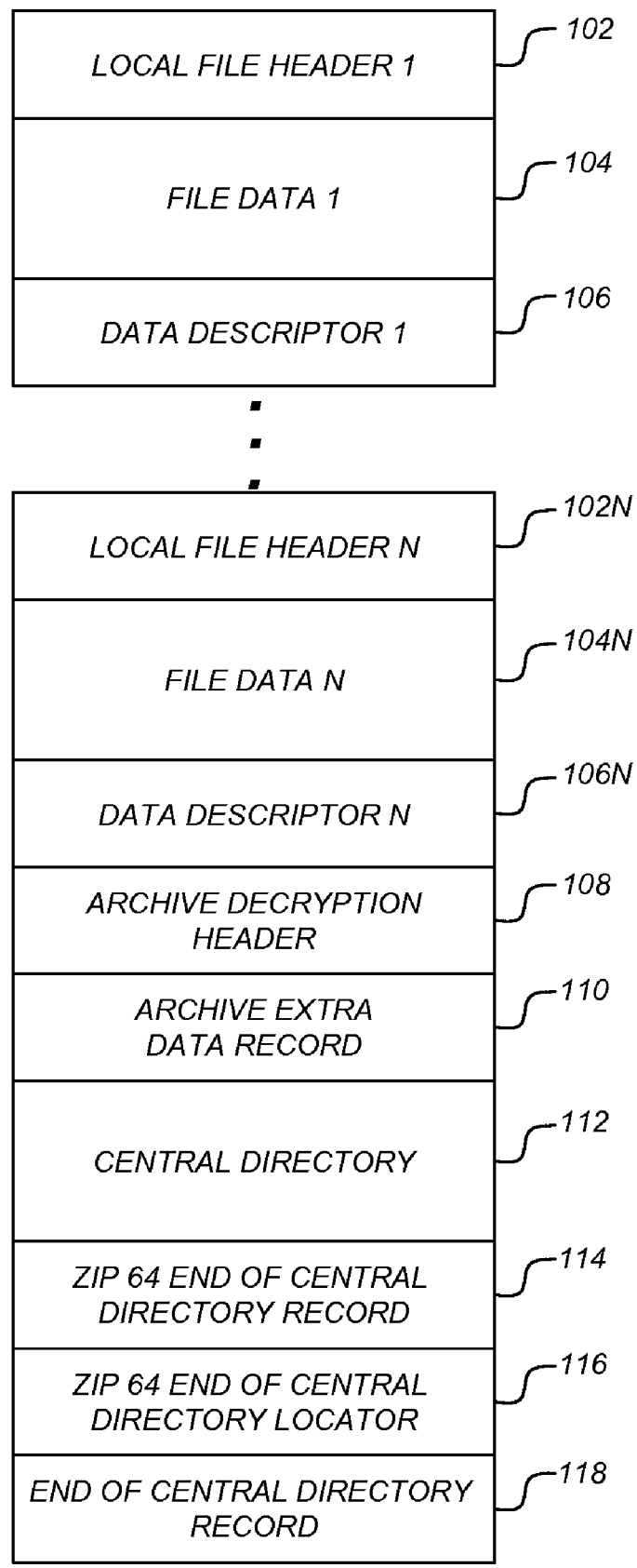
FIG. 1 illustrates the overall structure of the ZIP format of the prior art.

To locate and load the various blocks, the central directory 112 is used. The initial task is determining where the central directory 112 starts and ends. The end of central directory record 118 is used for this purpose. As illustrated in FIG. 1 (and the text above), for any valid ZIP™ file (ZIP32™ or ZIP64™) the end of central directory record 118 must be present. So the signature of end of central directory 118 (0x06054b50) (which is the first entry in the end of central directory record 118) is the bootstrap signature where the entire loading process is fired. In other words, regardless of whether the files ZIP32™ or ZIP64™, all ZIP™ files have the end of central directory record 118.

To find the beginning of the end of the central directory record 118 (i.e., the signature), a back scan of the ZIP™ archive is performed. The backscan is performed from an offset (that is calculated based on the characteristic of the end of central directory record 118) to the end of ZIP™ archive. The minimum and maximum sizes of the end of central directory record 118 are known (based on the standard data in the end of central directory record 118). In addition, the end of central directory 118 is always continuously stored as the last chunk of data in the ZIP™ archive. Accordingly, only part of the file ZIP™ file needs to be scanned, instead of from the start of ZIP™ archive (offset 0), thereby minimizing I/O and improving performance.

The backscan essentially scans four bytes at a time until the entire end of central directory record 118 is loaded. However, to load the actual data blocks, a determination must be made regarding whether the ZIP™ file is ZIP32™ or ZIP64™ compliant. In this regard, different loading may need to be performed depending on whether the ZIP™ file is a ZIP64™ or ZIP32™. Accordingly, to determine where the other indexing blocks are (which will point to the correct locations of the file blocks themselves) the process must determine the type of ZIP™ file. Based on the data in the end of central directory record 118 that has been loaded, a determination can be made regarding whether the ZIP™ file is ZIP32™ or ZIP64™ compliant. For example, the following properties in the end of central directory record 118 may be used to determine the type of ZIP™ file: number of the disk, the number of the disk with the start of the central directory, the total number of entries in the central directory on this disk, the total number of entries in the central directory, the size of the central directory, and the offset of the start of the central directory with respect to the starting disk number. In this regard, if any of these fields in the zip end of central directory record 118 is in its maximum size (0xffff for 16 bits, 0xffffffff for 32 bits), the ZIP™ archive is a ZIP64™ format file.

Once it has been determined whether the ZIP™ archive is a ZIP32™ or ZIP64™ archive, the loading process for the ZIP™ files can be initiated.

For ZIP32™ files, the central directory 112 starting offset is indexed directly in the end of central directory record 118 field "offset of start of central directory". Thus, after locating and loading the central directory 112, each central file header 102/102N can be used to index the offset of each local file block. Thereafter, each local file block is located and loaded.

For ZIP64™ files, the central directory 112 starting offset is indexed in the ZIP64™ end of central directory record 114. The ZIP64™ end of central directory record 114 is indexed in the ZIP64™ end of central directory locator 116. Thus, to index the central directory 112, the ZIP64™ end of central directory locator 116 must be located. This locator 116 is immediately layout adjacent to the end of central directory record 118. Accordingly, the end of central directory locator 116 can be easily located and all of the blocks can be loaded thereafter.

Figure 3:
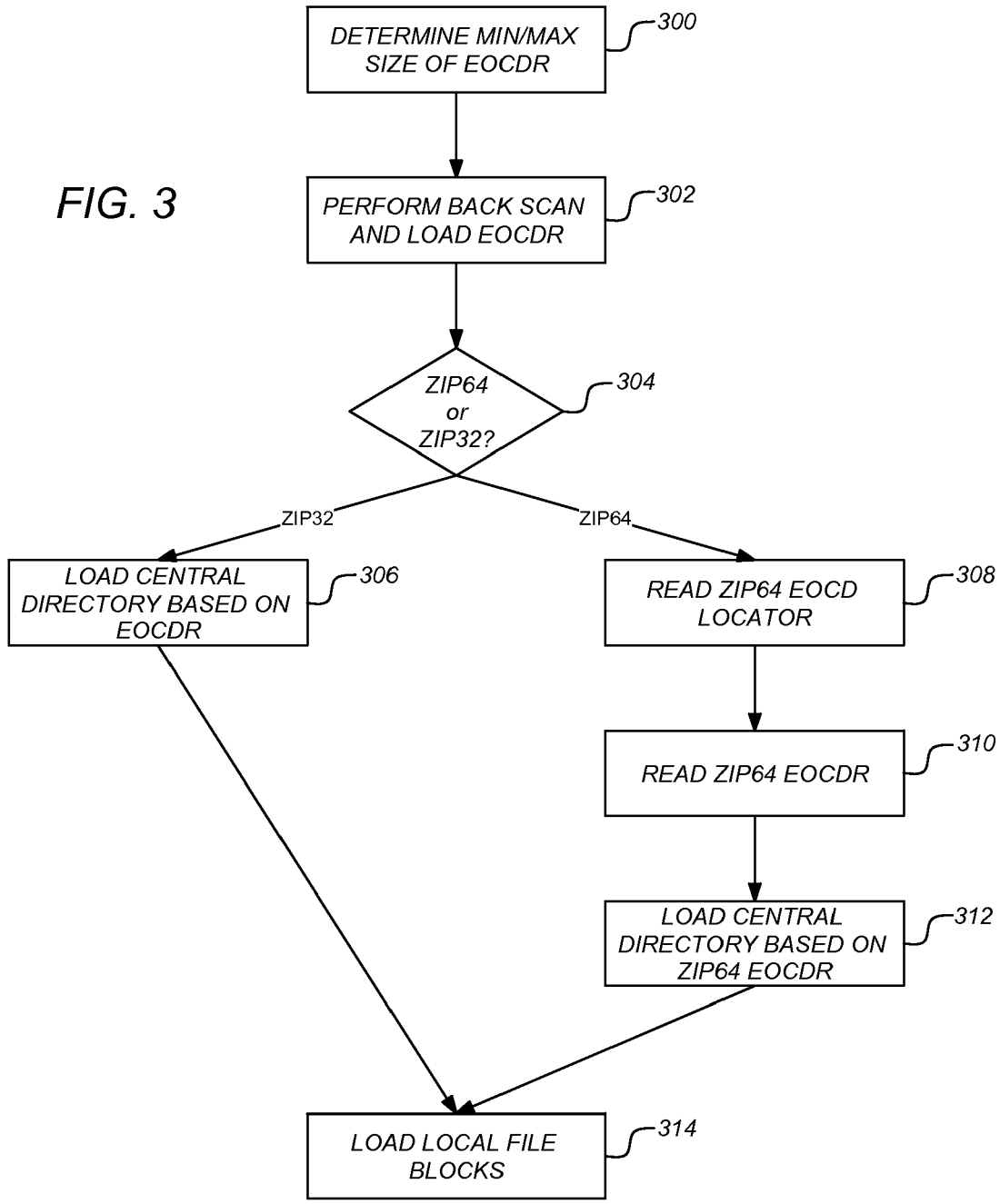
FIG. 3 illustrates the logical flow for loading data blocks in accordance with one or more embodiments of the invention.

FIG. 3 illustrates the logical flow for loading data blocks in accordance with one or more embodiments of the invention. At step 300, the minimum and maximum sizes of the end of central directory record 118 are determined. At step 302, a back scan of the ZIP™ archive is performed based on the minimum and maximum sizes and the end of central directory record 118 is loaded.

At step 304, a determination is made regarding whether the ZIP™ archive is ZIP32™ or ZIP64™. If the archive is ZIP32™, the central directory 112 is loaded based on the data in the end of central directory record 118 at step 306. However, if the archive is ZIP64™, the ZIP64™ end of central directory locator 116 is used/loaded at step 308 to find the ZIP64™ end of central directory record 114 which is read at step 310 and which in turn is used to identify the location of the central directory 112 which is loaded at step 312. Thereafter, based on the data in the central directory 314, the local data blocks are loaded at step 314.

Saving Process

When a block in the archive (e.g., a ZIP™ entry) is modified/updated, the updates should be saved within the archive or they will be lost. The saving process updates the modified or dirty ZIP™ entry. Each block (including the central directory 112 entry) in the ZIP™ archive has a dirty flag that indicates whether the block has been modified since the last save operation.

Thus, when conducting a save operation, a loop checks the dirty flag for each block entry. However, if a block is dirty, it must update and mark all of the block's references as also being dirty (or as requiring an update). Thus, every block will first perform a pre-save refresh to update its references. For example, each entry in the central directory 112 (i.e., the central file header) has a reference to the corresponding local file block 104/104N, so before every central directory 112 entry (i.e., central file header) is saved, it needs to update the information from the local file block 104/104N/header 102/102N.

As an example, suppose a local file block 104/104N has been modified. Once modified, the presave operation would update the local file header 102/102N information. The central directory 112 and headers within the central directory reference each local file block 104/104N. Accordingly, the central directory 112 headers are dirty (since the local file block 104/104N has been modified). The central directory 112 headers are updated with the up-to-date local header 102/102N information. Once complete, the central directory is up-to-date. Thereafter, the end of central directory records 114-118 must be updated to reflect the accurate information (e.g., the total number of entries in the central directory and end of central directory or ZIP64™ end of central directory pointers).

Figure 4:
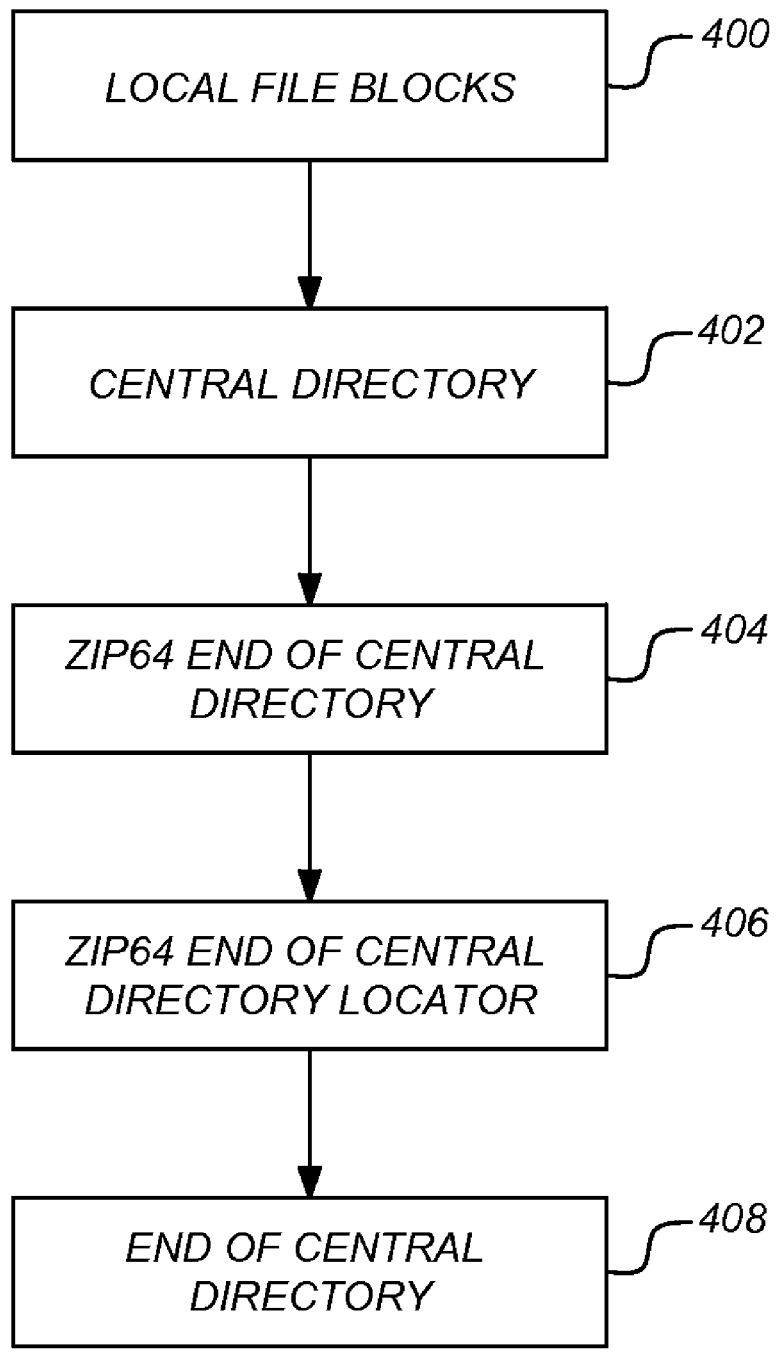
FIG. 4 illustrates the logical flow for performing a save sequence to update a ZIP™ archive file in accordance with one or more embodiments of the invention.

In view of the above, FIG. 4 illustrates the logical flow for performing a save sequence to update a ZIP™ archive file in accordance with one or more embodiments of the invention. At step 400, the local file blocks 104/104N are saved. At step 402, the central directory 112 is updated with the up-to-date information from the local file blocks 104/104N and local file header 102/102N information. At step 404, the ZIP64™ end of central directory record 114 is updated (e.g., if it is in the ZIP64™ format). At step 406, the ZIP64™ end of central directory locator 116 is updated with the most recent information (if it is in the ZIP64™ format). Lastly, at step 408, the end of central directory record 118 is updated with all of the updated information.

In one or more embodiments of the invention, a local file block map must be maintained. The local file block map is a data structure with key-value pairs that maintains the valid local blocks. The key for a block map entry is the name of the zip entry associated with the local file block 104/104N, and the value is a pointer pointed to a local file block runtime object. The local file block map can be used at run time to locate a local file block quickly. The local file block map is merely provided with a key and the location or the actual local file block is returned.

Dynamic Building of Free Block List

The free block list is a list of the free blocks (i.e., the blocks available to store information in the ZIP™ archive. The list is based on the offsets stored in the central directory 112. The concept is that if there are no free blocks, every offset stored in the central directory 112 will form a continuous linear layout (e.g., sequential) of the local file. If such a sequence cannot be formed, then there is a missing piece that can be assumed to be a free block.

Accordingly, the free block list is built dynamically based on a map storing valid information of all local file blocks. Since each block is stored physically continuous, concatenating every block forms a contiguous valid ZIP™ entry available for storage. For each block, if it's not an orphaned free block (an orphaned free block is also referred to as a raw data block), it must be registered in the central directory 112. Accordingly, each block that is indexed by the central directory 112 is processed by checking its start offset and end offset to build an offset range for block n. All of the registered blocks are concatenated together and compared with the whole address space of the entire ZIP™ archive to find out the missing segments; these missing segments are free blocks that are not indexed by central directory 112.

Various implementations are possible. In one or more embodiments, two maps may be used—one map stores the start offset of an indexed block as a key, and the other map stores the end offset of the indexed block as a key. Subsequently, each indexed block is processed wherein the indexed block's adjacent offsets are checked (i.e., start offset −1 and end offset +1) to see if the two offsets are indexed in the two previously built maps. If either offset is not indexed in the two maps, then it may be assumed that the non-indexed offsets must be either start offset or end offset of a free block. Such offsets are then added to the two lists. Further, a two way merge may be used to iterate both lists and obtain the final free block list—a map with key:value pairs as start offset:end offset of free blocks.

Figure 5:
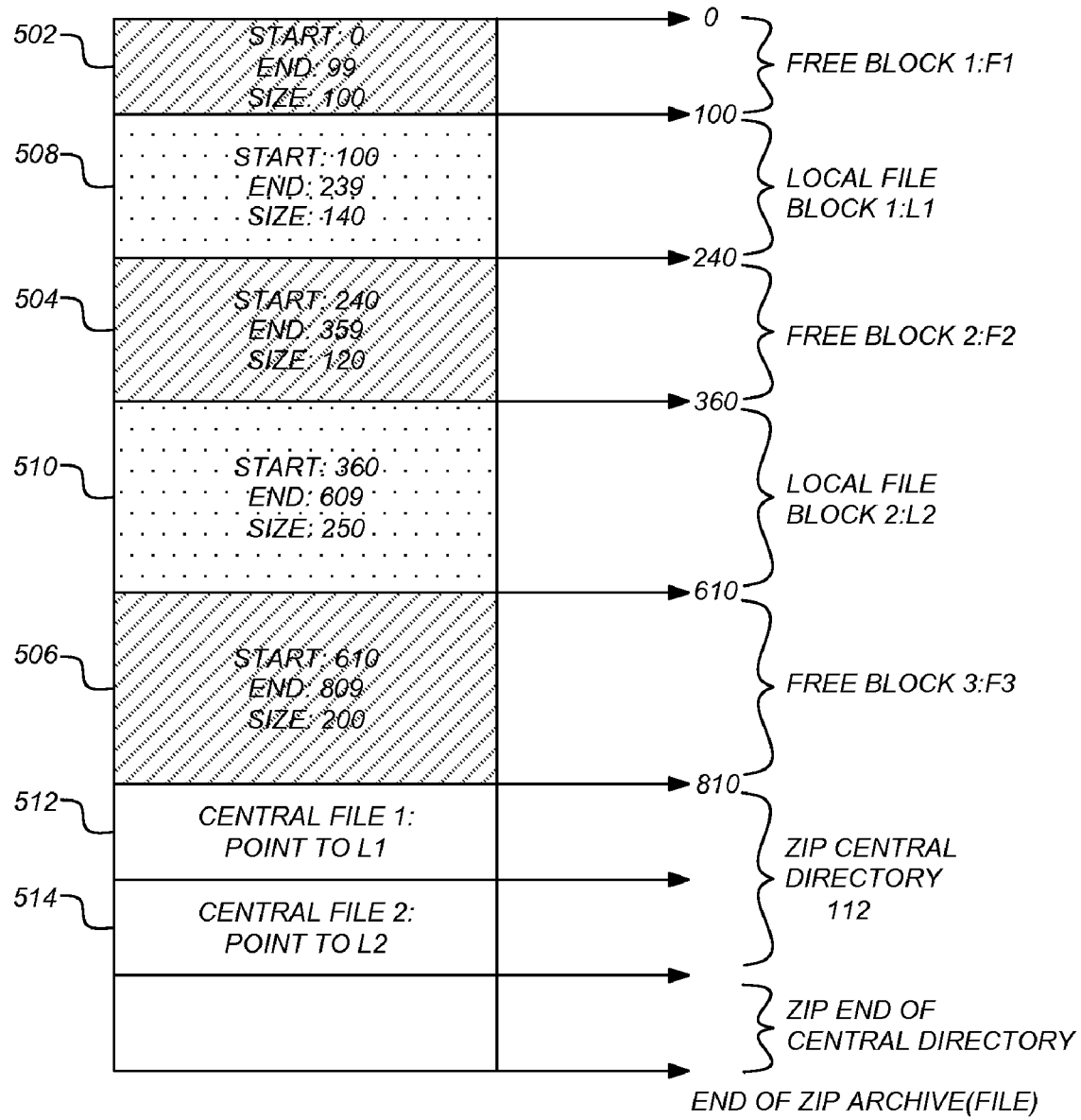
FIG. 5 illustrates the layout of a ZIP™ file with some free blocks in accordance with one or more embodiments of the invention.

In view of the above, the list of free blocks is dynamically generated at run time by processing/iterating through the known valid information for the local blocks in the central directory 112. FIG. 5 illustrates the layout of a ZIP™ file with some free blocks in accordance with one or more embodiments of the invention. The striped blocks 502, 504 and 506 are free blocks. The [START] field indicates the start offset of each block. The [END] field indicates the end offset of each block and the [SIZE] field indicates the size of each block. If not explicitly stated, all of the offsets are the distance (in bytes) from the start of the file. The dotted blocks 508 and 510 are local file blocks (i.e., a ZIP™ entry).

Local file blocks 508-510 each contain a local file header (e.g., 102/102N) which stores various information such as size, compression info, date time, entry name etc., and a local file data section (e.g., 104/104N) which stores (either compressed or not) data of the ZIP™ entry. The data stored in a local file block 508-510 must layout continuously; it can't be fragmented into several sections. Accordingly, a local file block 508-510 is an atomic block that can not be segmented anymore.

In FIG. 5, there are two local file blocks, L1 508 and L2 510. There are also three free blocks, F1 502, F2 504, and F3 506. Only local file blocks 508-510 are visible, since they both have a central file header representative in the central directory 112: Central File Header1 512 points to L1 508, and Central File Header2 514 points to L2 510. All three free blocks, L1 502, L2 504, L3 506 are invisible (to 3rd party ZIP™ such as WINZIP™, WINRAR™, etc.) since their corresponding central file headers 512-514 are not in the central directory 112 (these three blocks 502-506 may not have a local file header 102/102N which is within the ZIP™ format). In this regard, since a free block 502-506 can contain any content within the block, a free block 502-506 does not have to have a legal ZIP™ local file header in it.

To obtain a ZIP™ file with free blocks 502-508, embodiments of the invention may provide an application programming interface (API) routine that deletes a ZIP™ entry and reclaims its local storage by filling junk data in it.

Referring again to FIG. 5, suppose the illustrated file is being processed with the free blocks 502-506. As described above, a local block map may be established at the loading process. The local block map stores each runtime object of the local block 508-510. Each runtime object of the local block 508-510, in turn, can provide the offset of the local block 508-510, and the size of the local file block 508-510.

Figure 6:
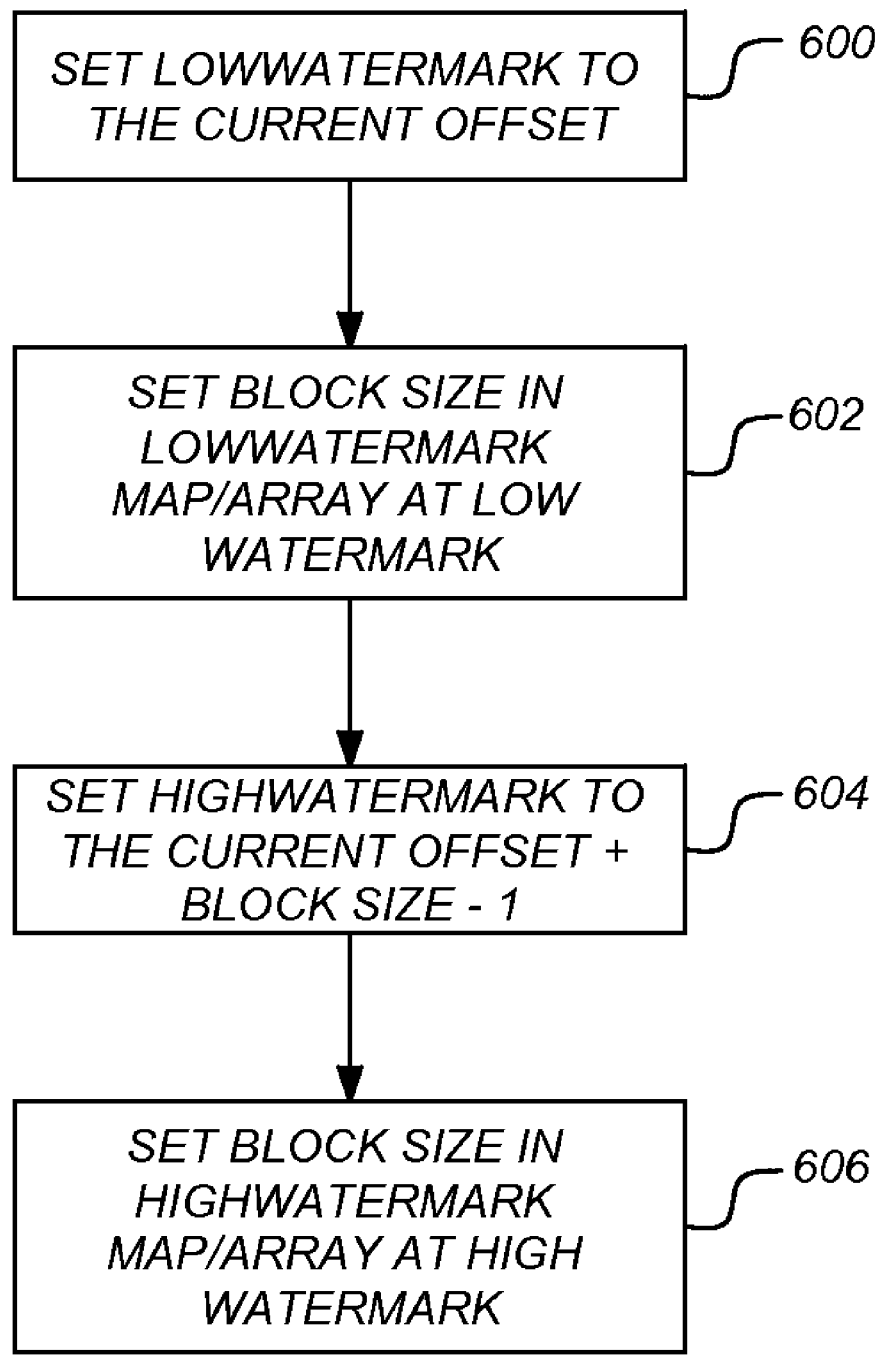
FIG. 6 is a flowchart illustrating the dynamic building/creation of two offset maps in accordance with one or more embodiments of the invention.

FIG. 6 is a flowchart illustrating the dynamic building/creation of two offset maps in accordance with one or more embodiments of the invention. The two offset marks are (1) a low watermark map, and (2) a high watermark map. Both maps are for the low and high watermarks (i.e., watermarks designating the start and end offset values) for registered (i.e., indexed) local file blocks 508-510 (and not the free blocks 502-506). The high watermark map is a map of all high watermarks (e.g., end offsets) for registered local file blocks 508-510. The key is the end offset of the local file block 508-510, and the value is the block size of the local file block 508-510. The low watermark map is a map of all low watermarks (e.g., starting offsets) for registered local file blocks 508-510. The key is the start offset of a local file block 508-510 and the value is the block size of the local file block 508-510. The steps of FIG. 6 are performed for every known block 508-510 (i.e., every block that is indexed in the central directory).

At step 600, the LowWatermark value is set equal to the current block offset (i.e., nLowWatermark=block.offset). At step 602, the value/key in the low watermark map/array at the low watermark value is set equal to the block size (i.e., lowWatermarkMap[nLowWatermark]=block.size). At step 604, the HighWatermark value is set equal to the current offset plus the block size minus 1 (i.e., nHighWatermark=block.offset+block.size−1). At step 606, the value/key in the high watermark map/array at the high watermark value is set equal to the block size (i.e., highWatermarkMap[nHighWatermark]=block.size).

The processing performed in FIG. 6 may be more easily understood by referring to FIG. 5. The steps of FIG. 6 are processed for the first time with the first local file block L1 508 where the start is 100, end is 239, and size is 140. Once processed via FIG. 6, the values of the various properties are:
 lowWaterMarkMap[100]=140;
 highWaterMarkMap[239]=140;
Thus, the content of the lowWaterMarkMap and highWaterMarkMap are:
 Content of lowWaterMarkMap: {100: 140}
 Content of highWaterMarkMap: {239:140}
In the second loop performance of FIG. 6, the second local file block L2 510 is processed wherein the start is 360, end is 609, and size is 250. Once processed via FIG. 6, the values of the various properties are:

lowWaterMarkMap[360]=250
highWaterMarkMap[609]=250

Since there are only two local file blocks 508-510 in FIG. 5, the loop is complete and the steps of FIG. 6 are not processed again. Once complete, the following properties in the map have been established:

Content of lowWaterMarkMap: {100:140}, {360, 250}
Content of highWaterMarkMap: {239:140}, {609, 250}

Figure 7:
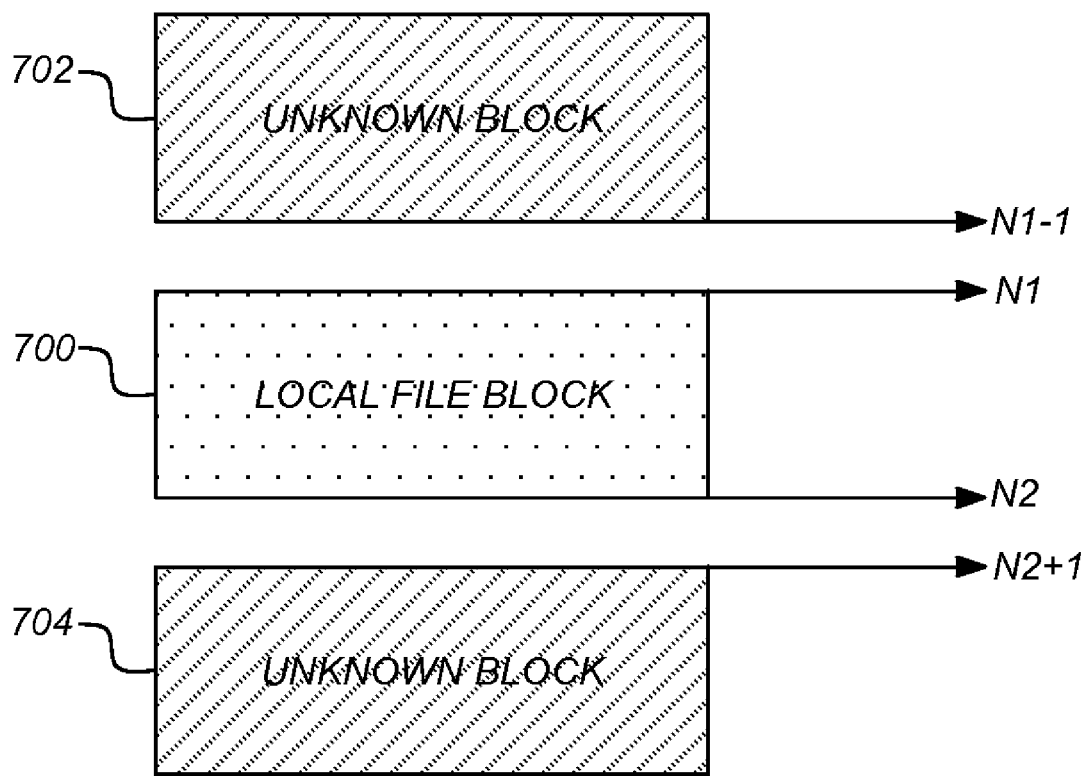
FIG. 7 illustrates the relationship between offsets of blocks in an archive in accordance with one or more embodiments of the invention.

Once the above two maps have been established per the steps of FIG. 6, the next step is to determine and to index the free blocks within the archive. To index the free block maps, a free block watermark map is created that records the watermark information of the free blocks. The key is the start offset of a free block and the value is the end offset of the free block. The process of creating the free block watermark map is based on the fact that for any local file block, its adjacent block, either before or after it, should be either a local file block 508-510 or a free block 502-506. FIG. 7 illustrates the relationship between offsets of blocks in an archive in accordance with one or more embodiments of the invention. As illustrated, a local file block 700 has an offset (i.e., a start offset) of N1 and an end offset of N2. N1−1 is the end offset of the previous block 702, and N2+1 is the start offset of the subsequent block 704. The three blocks are continuous. In view of the above, embodiments of the invention may dynamically create four maps—(1) a low watermark map for local file blocks 508-510; (2) a high watermark map for local file blocks 508-510; (3) a free high watermark map for free file blocks 502-506; and (4) a free low watermark map for free file blocks 502-506.

Figure 8:
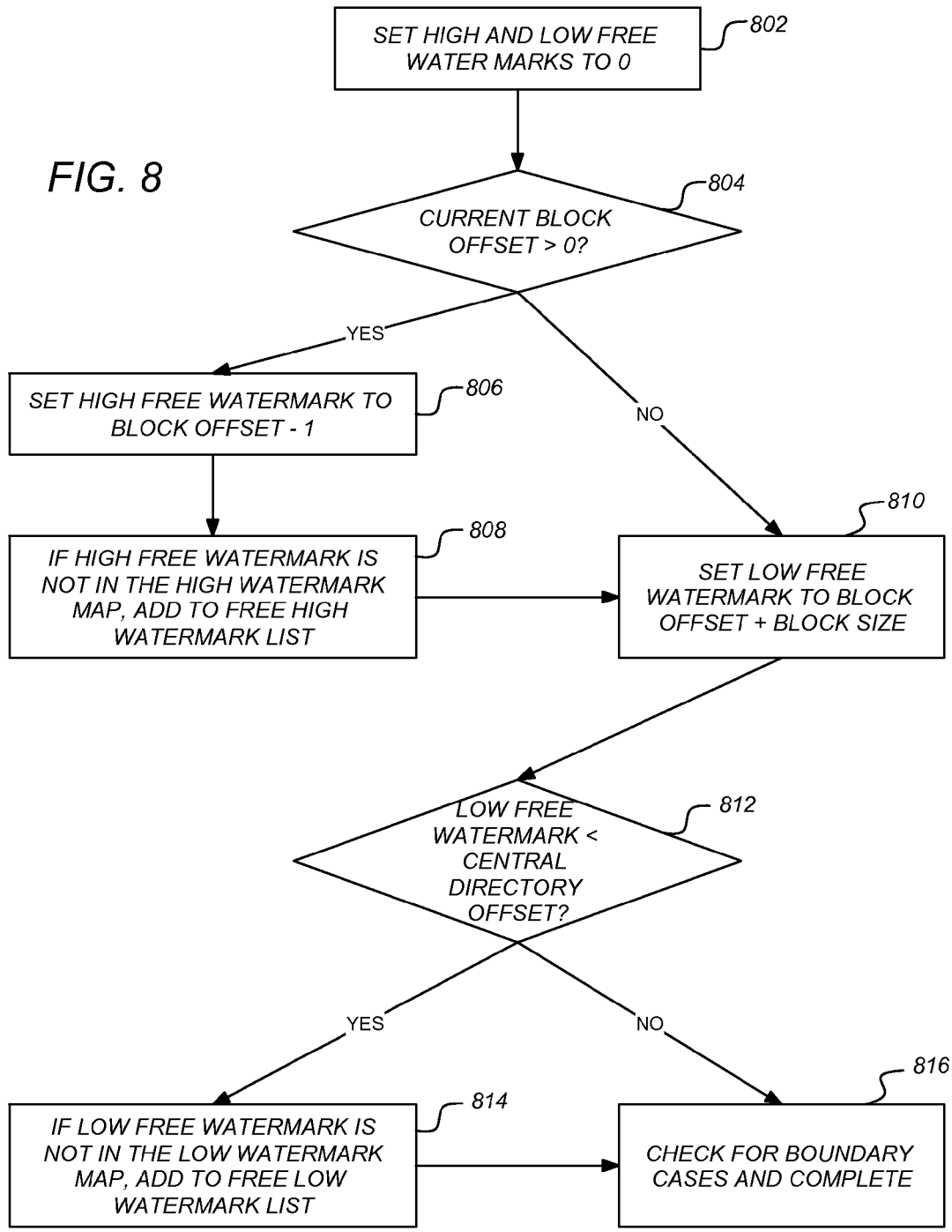
FIG. 8 is a flow chart illustrating the steps for indexing the free blocks (i.e., finding and creating the free high and free low watermark maps with the offsets of the free blocks) in accordance with one or more embodiments of the invention.

FIG. 8 is a flow chart illustrating the steps for indexing the free blocks (i.e., finding and creating the free high and free low watermark maps with the offsets of the free blocks) in accordance with one or more embodiments of the invention. The steps of FIG. 8 are performed once for each indexed block 508-510. At step 802, the high and low free watermark values are set to 0.

At step 804, a determination is made regarding whether the current block offset (i.e., of the first local file block) is greater than 0 (i.e., whether it is at the beginning of the archive or not). If the current block offset is greater than 0, a test is conducted to determine if the offset located at one less than the current offset is in the list/map of high watermarks for the local file blocks. To conduct such a test, the high free watermark value is set to the current block offset −1 at step 806 and the high watermark map is searched to see if the high free watermark value is in the map at step 808. If the high free watermark value is not in the map, one may assume that it is the high watermark of a free block 502-506 and the value is added to the free high watermark list/map (again at step 808). If it is in the map, then the offset is for a local file block 508-510 and no further action may be necessary.

At step 810, the low free watermark value is set to the current block offset (i.e., of the current local file block 508-510 being processed)+the block size of the current local file block 508-510.

At step 812, a determination is made regarding whether the low free watermark value is less than the offset of the central directory 112. In other words a determination is made regarding whether the offset currently being examined is part of the central directory 112 or not. If not part of the central directory 112, the low water map (containing the low watermarks of the local file blocks 508-510) is searched for the low free watermark value at step 814. If the low free watermark value is not in the low watermark map, one can assume that it is a low watermark for a free block 502-506 and it is added to the free low watermark list/map at step 814.

To ensure accurate processing, the system may then check for various boundary conditions before concluding at step 816. For example, one boundary condition determines if a free block is the first block in the archive and adds the block to the free low watermark list/map if necessary. Another condition checks if the last block before the central directory 112 is a free block and updates the free high watermark list/map if necessary. Such completion of processing may further sort the free low and high watermark list/maps as well as instantiate a single free watermark map with appropriate keys and values if necessary.

To better illustrate the processing of FIG. 8, one may examine FIG. 5 and how the blocks therein are processed. The first block to be processed is that of local file block L1 508. Since the offset of local file block L1 508 is greater than 0 (e.g., at step 804), the high watermark free block value is set to 100−1=99.

From the processing of FIG. 6, the high watermark map (of local file blocks 508-510) consists of {239:140}, {609, 250}. This map is searched for the high watermark free block value of 99 at step 808. The value 99 is neither 239 nor 609. It may be noted that only keys are searched and not the values. In this regard, 140 and 250 are values and not keys of the map (and hence are not searched at this time). Since the high watermark map of the local file blocks 508-510 should contain all local file block's 508-510 end offsets, one can safely assume that 99 is the end offset of a free block immediately preceding L1 508. In this regard, if 99 were an offset of a local file block 508-510, it would appear in the high watermark map of the local file blocks 508-510. Thus, the value 99 is added to the free high watermark map for free file blocks 502-506 (which is a list contains all end offsets of free blocks 502-506).

The processing of FIG. 8 then proceeds to step 810 wherein the low free watermark value is set to the current block offset plus the block size:

$$n\text{LowWaterMarkFreeBlock} = L1.\text{offset} + L1.\text{size} = 100 + 140 = 240.$$

The value 240 is then compared to the start offset of the ZIP™ central directory (i.e., 810) at step 812. Since 240<810, the process continues with step 814. As described above, the map of the low watermarks for the local file blocks 508-510 contains {100:140}, {360, 250}. The value 240 is not either 100 nor 360, which are all keys in the low watermark map. Since the low watermark map for the local file blocks 508-510 should contain all local file block's 508-510 start offsets, one can safely assume that 240 is the start offset of a free block immediately after L1 508 (i.e., for free block F2 504). Accordingly, the value 240 is added to the free low watermark map for free file blocks 502-506.

To this point, the loop of FIG. 8 has been iterated for the first block, L1 508. The loop is iterated again for the second local file block L2 510. Based on the above described process, the high free watermark value is set to the block offset 360−1=359 and the low free watermark value is set to the block offset plus the block size (360+250=610). The value 359 is not in the low watermark map for local file blocks 508-510 and 610 is not in the high watermark map for local file blocks 508-510. Accordingly, both values are added to the corresponding free block maps.

Thus, after processing through step 814 for both the first block 508 and the second block 510, the high free watermark map contains {99, 359} and the low free watermark map contains {240, 610}.

The processing then continues with the boundary cases at step 816. The value 0 is not in the low watermark map for local file blocks 508-510: {100:140}, {360, 250}. Accordingly, 0 must be a low watermark for a free block (i.e., free block F1 502 and is added to the free low watermark map. In addition, the value of the central directory offset minus one (i.e., 810−1=809) is not in the high watermark map for the local file blocks 508-510: {239:120}, {609, 250}. Thus, the value 809 is added to the free high watermark map.

The resulting high and low free watermark maps are:
High: {99, 359, 809}
Low: {0,240,610}

From these two maps, the list of all free blocks may be dynamically generated:
{0, 99}; {240, 359}; {610, 809}.

In the above, {0,99} means the start offset of the free block is 0, the end offset of this free block is 99.

Updating a ZIP™ Entry In Place

In the prior art, all ZIP™ entries are fixed in the sense that their size, position, and offset are fixed. If a ZIP™ entry is updated, the data may expand or shrink. Accordingly, to maintain the ZIP™ file, adjacent data must move, shrink or expand which results in the rewrite of the entire ZIP™ file.

To provide many advantages, one or more embodiments of the invention provide the ability to perform in place editing of a ZIP™ entry without requiring the rewriting of the entire ZIP™ file. There are at least two different modes that can enable such in place editing: (1) Append Mode; and (2) Automatic Growth/Reclamation Mode. Embodiments of the invention may allow the user to establish/select which mode/model to use.

Append Mode

In the append mode, when a ZIP™ entry is edited, the ZIP™ local file header of the entry is copied and appended to the end of the ZIP™ archive. Further, the corresponding central file header in the central directory is updated to point to the local file header near the end of archive, instead of the original one. This effectively orphans the old local file block (header+entry data), so the original location of the entry may then be freed up for new data.

Before any writes (updates) to the ZIP™ entry, the current local file block associated with the entry will be reincarnated (e.g., cloned) by being moved (only local file header section, old data doesn't move) to the start offset of the central directory 112. The central directory 112 is marked as dirty after the local file block is reincarnated. Then the write is performed, directly to the new local file block data section at the end of ZIP™ archive. The old orphaned local file block can be either killed, or just left intact. When the local file block is killed, the ZIP™ saving process will fill the old local block with zeros, thus making recover of the old block not possible. When the local file block is left intact, recovery of the old block, as well as data it contains, is possible which is further discussed below. The central directory 112 now knows its final persistent offset which is immediately following the last byte of the bytes just written to the updated block, at the end of archive. However, if the archive is created via a streaming scenario, then the local file descriptor follows the last data byte, in which case, the offset of the central directory 112 immediately follows the local file descriptor. The central directory 112 triggers the indexing blocks saving process (as described above), and each block is updated with references and saved to the correct offset.

FIGS. 9A, 9B, and 9C illustrate the prior art write process, the original ZIP™ archive to be updated, and the append mode for updating an entry in place in accordance with one or more embodiments of the invention. FIG. 9B represents the original ZIP™ archive to be modified. Suppose original ZIP™ Entry 1 902B is going to be updated.

FIG. 9A illustrates the common prior art practice of rewriting the entire ZIP™ archive. All entries 904A, 906A, and 908A after Zip Entry 1 902A must be rewritten (moved) to leave spaces for Zip Entry 1 902A to grow.

FIG. 9C utilizes the append mode in accordance with one or more embodiments of the invention that leave the entry being modifying 902C intact (i.e., in the form of free block 902C). A new zip entry 910C is created at the end of ZIP™ archive by cloning the information stored in ZIP™ Entry 1 902B, and all new data associated with ZIP™ Entry 1 902B will start writing at the new location (i.e., at the end of the ZIP™ archive).

Correspondingly, the central header 908B stored in the central directory 112 mapping to ZIP™ Entry 1 902B changes its reference from the "old" ZIP™ Entry 1 902B to the newly created entry 910C at the end of ZIP™ archive. Accordingly, the old ZIP™ Entry 1 902C is invisible to the outside world. The bytes occupied by old ZIP™ Entry 1 902B may be zeroed out and this local file block now becomes a free block 902C. Such an append operation may have a significant performance bonus over the prior art rewriting approach of FIG. 9A.

Figure 10:
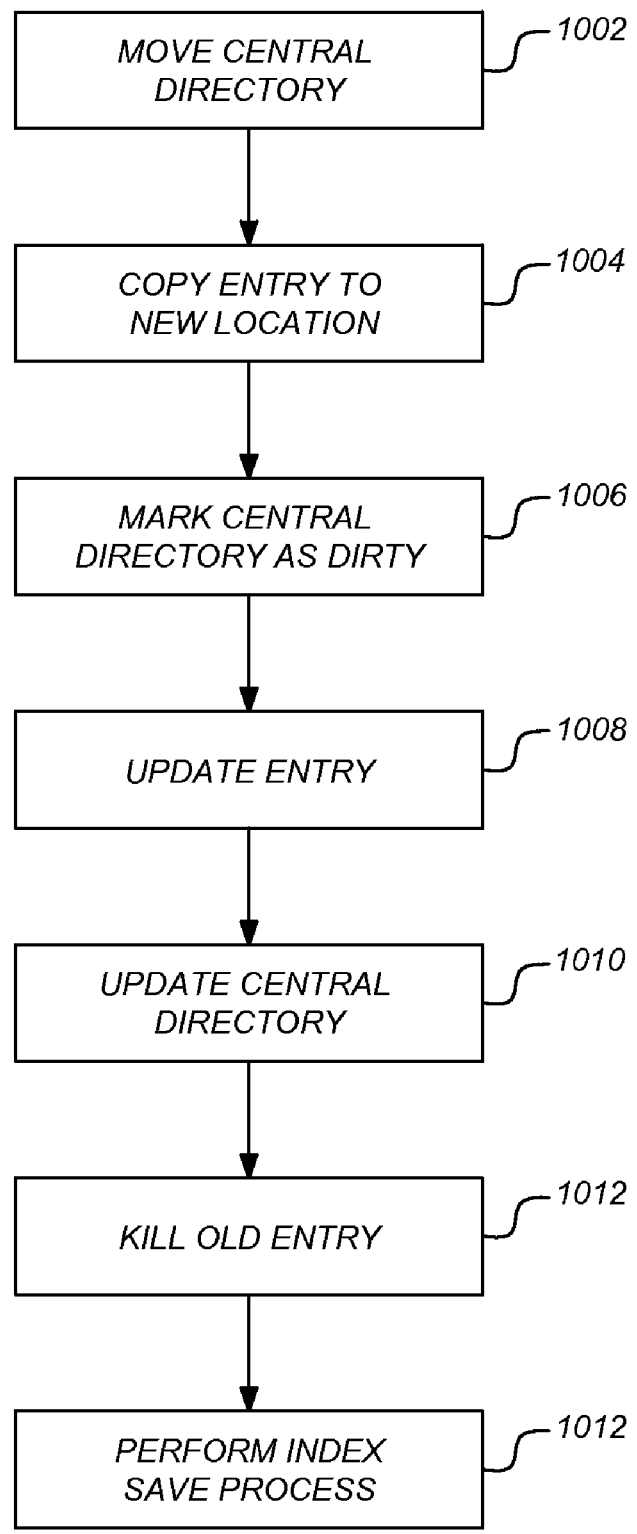
FIG. 10 is a flow chart illustrating the updating of a ZIP™ entry in place using the append mode in accordance with one or more embodiments of the invention.

FIG. 10 is a flow chart illustrating the updating of a ZIP™ entry in place using the append mode in accordance with one or more embodiments of the invention. At step 1002, the central directory 908 is moved to accommodate the updated entry. Alternatively, the central directory 908 may be created dynamically and thus, step 1002 may be an optional step.

At step 1004, the old ZIP™ entry 902 is copied/cloned/reincarnated to the start offset of the old location of the central directory 908.

At step 1006, the central directory 112 is marked as dirty since it now points to the new location 910C of the entry (so that it is updated when the indexing save process is performed).

At step 1008, the cloned entry 902 is updated by appending/writing any data to the new location at the end of the ZIP™ archive (resulting in updated entry 910C).

At step 1010, the central directory 908 is updated to reflect the updated entry and location.

At step 1012, the old ZIP™ entry 902C is now orphaned and killed (e.g., filled with NULL characters) to provide the ability to store new data in the future.

The process concludes at step 1014 with the index block saving process which updates all of the data in the various records of the ZIP™ archive.

Automatic Growth/Reclamation Mode

In the automatic growth/reclamation mode, entries are not cloned (e.g., as in the append mode) but entries are modified in place and utilize free blocks if possible. Before a write occurs, a determination needs to be made where to write the new bytes. A determination is made regarding whether the current allocated local data space can accommodate the new bytes or not. In this regard, there are two possibilities: (1) existing space can accommodate the new bytes, or (2) existing space cannot accommodate the new bytes.

If the current allocated local data space can fill/accommodate the new bytes, the update will be performed in the (old) place. Any unused space will be treated as future growth space for this entry (runtime will decide to mark the block as a raw block, or simply leave it there if the overhead of the marker is too large for the unused spaces).

Figure 11A:
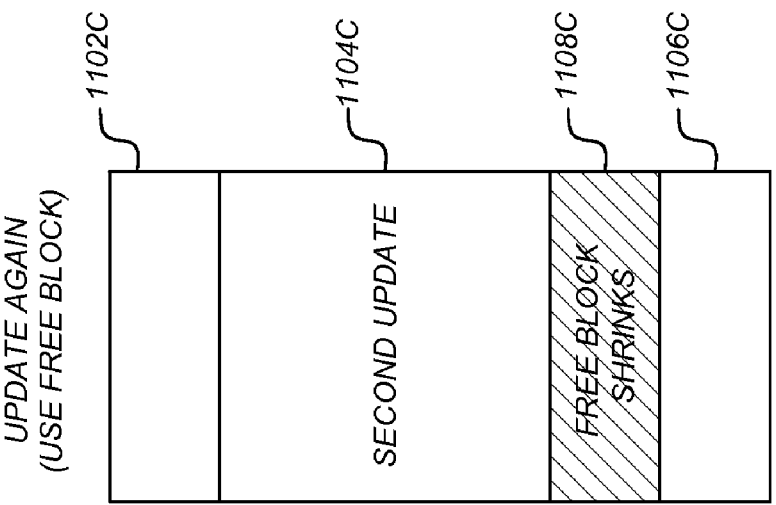
FIGS. 11A, 11B, and 11C illustrate an entry to be updated, and the performance of a first update, and a second update respectively when the old/previously allocated space can accommodate the new bytes in accordance with one or more embodiments of the invention.
Figure 11B:
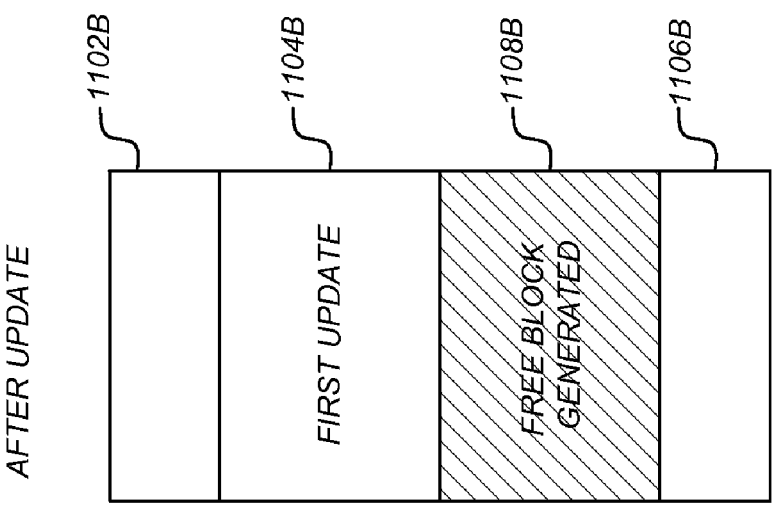
Figure 11C:
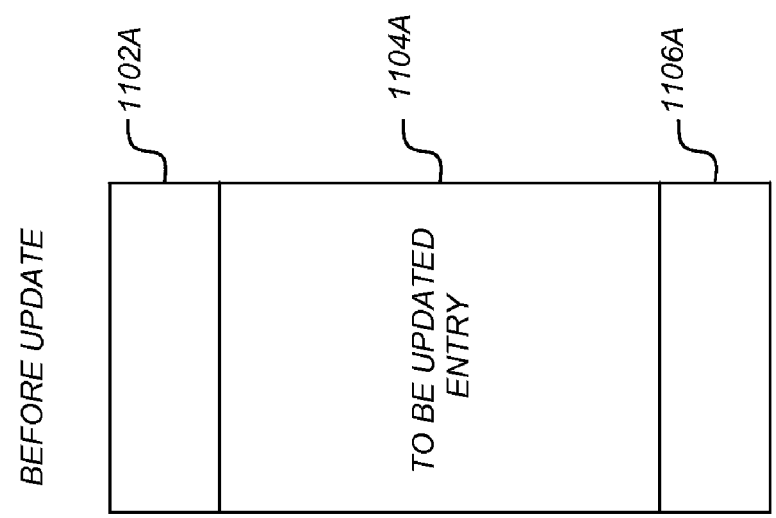

FIGS. 11A, 11B, and 11C illustrate an entry to be updated, and the performance of a first update, and a second update respectively when the old/previously allocated space can accommodate the new bytes in accordance with one or more embodiments of the invention. FIG. 11A illustrates three blocks/entries 1102A, 1104A, and 1106A with block/entry 1104A to be updated. A determination concludes that the size of the new entry is less than the size of the old entry 1104A. Accordingly, the entry 1104A will be updated in place.

FIG. 11B illustrates the result after a first update has been completed. The updated entry 1104B fits within the space previously allocated 1104A. Accordingly, the entry 1104 is updated in place with left space 1108B marked as a free block (e.g., zeroed out bytes in it) for future potential use.

In FIG. 11C, a second update is performed with the previously allocated space still accommodating the update. In such a situation, the second updated entry 1104C is performed in place and the free space 1108B shrinks to accommodate the update and provides a smaller free block 1108C.

Alternatively, if the current allocated local data space cannot fill/accommodate the new bytes, some data may need to be moved. A sequence of steps may be performed to determine which entry should be moved, where it should be moved to (at runtime), to find the optimal place to persist the new updated entry local file block and its data, and to minimize data that will be moved to improve I/O performance. In one or more embodiments, the list of free blocks is searched to see if there is a free block of a size that can accommodate the updated entry. If so, the entry may be moved there. Alternatively, embodiments of the invention may either switch to append mode or may move some blocks immediately following the current entry being modified to a new location (e.g., to a free block that can accommodate the entry or to the end of the archive). Once the appropriate blocks are moved to accommodate the update, all of the offsets are updated as described above.

Figure 12A:
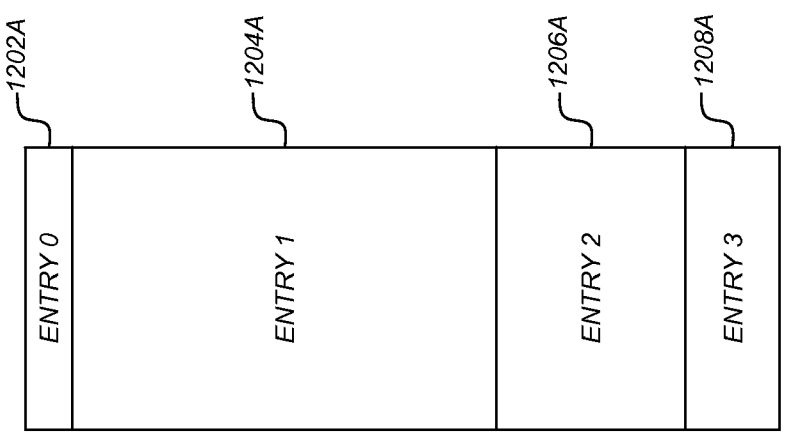
FIGS. 12A, 12B, and 12C illustrate the format of an archive with an entry to be updated (FIG. 12A), after the performance of a first update (FIG. 12B), and after the performance of a second update (FIG. 12C) in accordance with one or more embodiments of the invention.
Figure 12B:
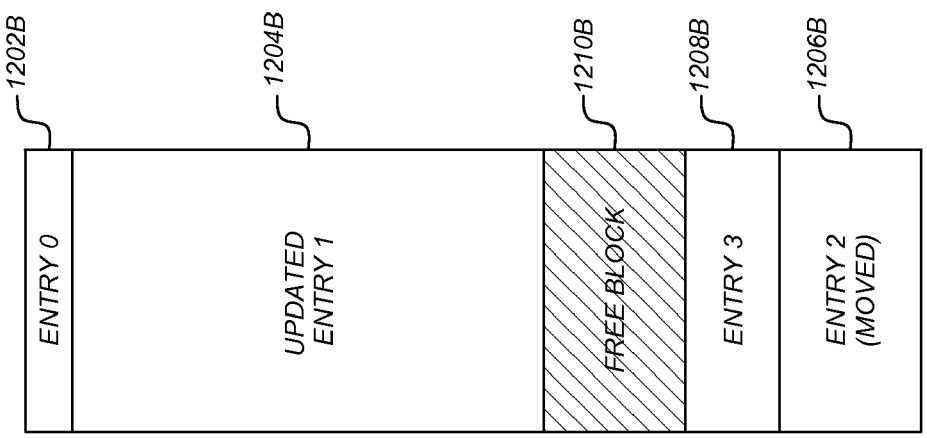
Figure 12C:
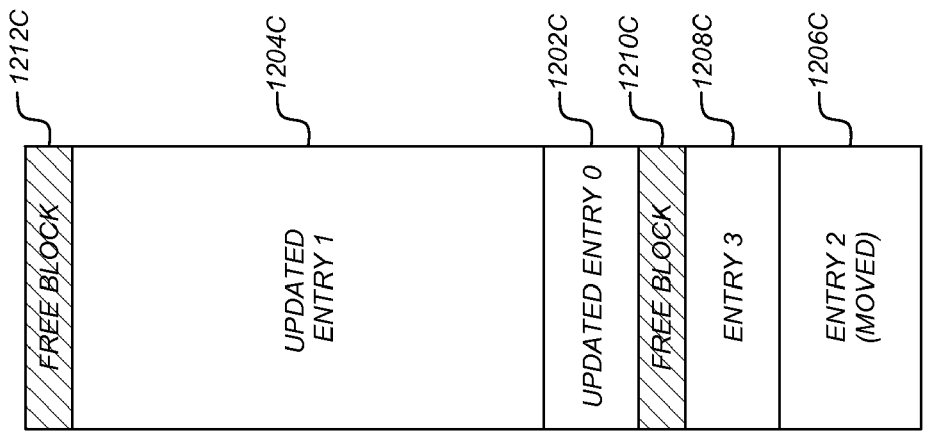

FIGS. 12A, 12B, and 12C illustrate the format of an archive with an entry to be updated (FIG. 12A), after the performance of a first update (FIG. 12B), and after the performance of a second update (FIG. 12C) in accordance with one or more embodiments of the invention. FIG. 12A illustrates four local file blocks/entries 0-3 1202A-1208A. Entry 1 1204A is to be updated and is going to expand.

FIG. 12B illustrates the result after updating Entry 1 1204A (which adds more bytes to the entry). There are no free blocks that can accommodate the updated entry. Accordingly, to allow Entry 1 1204A to update in place and to have sufficient space, Entry 2 1206A is moved to the end of the file (i.e., not 1206B). After updating, the unoccupied spaces of the old Entry 2 1206A, is marked as a free block 1210B. Thus, there were two options—(1) moving Entry 1 1204A to the end of the archive or (2) moving Entry 2 1206A to the end of the archive to accommodate the update to the larger file block Entry 1 1204A. To conserve on I/O, Entry 2 1206A is moved rather than Entry 1 1204.

FIG. 12C illustrates an additional update performed on Entry 0 1202. The update to Entry 0 1202 cannot fit in the existing allocated space of Entry 0 1202B. Further, Entry 1 1204B which follows Entry 0 1202B is much larger. Accordingly, Entry 0 1202B can be moved to the end of a file, or the file can be searched for a free block. Since free block 1210B is large enough to accommodate the update, Entry 0 1202B is moved (see 1202C) and the old Entry 0 1212C is marked as a free block. Further, the free block 1210B is shrunk into 1210C to accommodate updated Entry 0 1202C.

Figure 13:
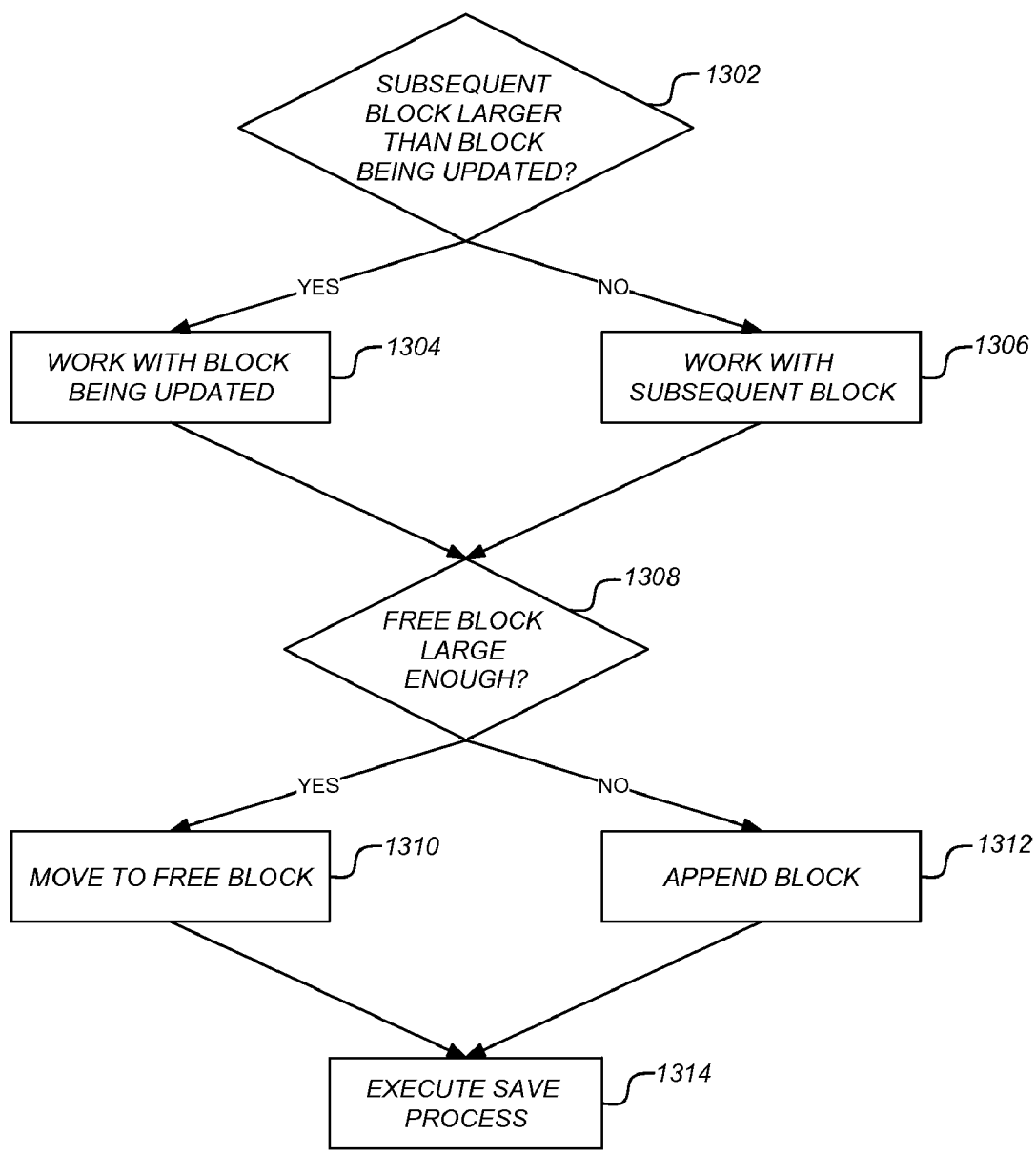
FIG. 13 is a flow chart illustrating the process for performing an update to an entry where the current space allocated is insufficient in accordance with one or more embodiments of the invention.

FIG. 13 is a flow chart illustrating the process for performing an update to an entry where the current space allocated is insufficient in accordance with one or more embodiments of the invention. At step 1302, a determination is made regarding whether the block following the block being updated is larger than the block being updated. If the subsequent/following block is larger, the process continues and works with the block being updated at step 1304. However, if the subsequent block is smaller, the process continues by working with the subsequent block at step 1306.

At step 1308, a determination is made regarding whether a free block is large enough to accommodate the block being updated or the subsequent block. If a free block is large enough, the block being updated or the subsequent block is moved to the free block at step 1310. Alternatively, if no free block is large enough, the append mode is used and the block being updated or the subsequent block is moved to the end of the archive ate step 1312. At step 1314, the save process if performed to update all of the records and offset values as described above.

Delete/Recover a ZIP™ Entry

Prior art ZIP™ tools rewrite the entire archive when deleting an entry (or entries). One or more embodiments of the invention avoid rewriting. Instead, the local file block associated with the deleted ZIP™ entry will be left intact when logically deleting the entry or filled with NULL characters when physically deleting the entry. This implies that the archive file size will never shrink when deleting entries "from" it. As a consequence, the speed of a delete operation is much faster than a rewrite operation, and logically deleted entries can be reclaimed if the local file block associated with this entry remains intact.

Logical (Soft) Deletion

In a logical/soft deletion, the central file header associated with the entry is removed from the central directory block, leaving the local file block (and file block header) intact. However, as the central file header is removed, the central directory size will shrink. In this regard, if the central directory is saved in the same offset, the end of central directory record 118 will not reach the end of the physical ZIP™ archive. Instead, there will be "junk" data left at the end of ZIP™ archive. One choice is to force the truncation of the archive file but this is an expensive operation. Alternatively, the archive may not be truncated and instead, the central directory and other indexing blocks may be pushed towards the end of ZIP™ archive, with the distance equal to the central file header (or headers) size. Such an embodiment, to two results: (1) the ZIP™ archive is valid and remains the same size as the old one, and (2) the last local file block now has a free block immediately following it with the free block size equal to the distance stride described above.

Physical (Hard) Deletion

With a physical/hard deletion, the logical/soft deletion is first performed. In addition, the local file block associated with the entry is marked as a raw block by burning the 12 byte marker (4 bytes signature+8 bytes block size) at the start offset of the block. Such a marking facilitates finding empty blocks. In this regard, even for blocks not marked as raw, such blocks may still be bound since it doesn't depend on these markers; the local file block list is the only source that is accessed.

Recover a Deleted ZIP™ Entry (Undelete)

A ZIP™ entry can be reclaimed only if the local file block associated with the entry is intact. Two scenario of entry recovery may occur: (1) in-process recovery, and (2) out-of-process recovery.

To perform an in-process recovery, the ZIP™ entry must have been deleted in process without closing the (library) process. To perform the recovery, the central file header associated with the entry is removed from central directory header list and the local file block is not removed from the local block map. To recover, the local file block map maintained by ZIP™ file system is queried. If a local block with the exact the same name as the name of the entry to be recovered is found (and also if such a local block is not dirty—i.e., its data has not changed), the central file header is simply recreated based on the local file block information stored in the local block map. The central file header is then merely added back to the central directory block.

For an out-of-process recovery, the ZIP™ entry is deleted in one process and the process is exited. Another application is then launched to load the ZIP™ archive. In other words, the process' cache no longer contains the entry and it must be regenerated. In such a scenario, the local file block map can't be consulted as an authorized source. Accordingly, the local file blocks are scanned to determine if the local file block can be recovered. Initially, a free block list is built based on the process described above. Thereafter, each free block list is scanned to locate the string of the entry name. If no block contains a string matching the ZIP™ entry name, the entry can't be reclaimed. If one or more blocks contain the entry name string, a validation procedure is fired to check if the block is a valid local file block (with valid signature, sizes, CRC, etc.). If the check shows that the data is verified, then the local file block is reincarnated and activated by performing two actions: (1) the local file block is added to the local block map, and (2) a central file header is created from the local file block and added to the central directory block file header list.

Example

FIGS. 14A, 14B, 14C, and 14D illustrate the format of an original archive, after the soft deletion of a first entry, after the recovery of the first entry, and after a hard deletion of the entry respectively in accordance with one or more embodiments of the invention. FIG. 14A illustrates the original ZIP™ archive with entries 1-4 1402A-1408A and central headers 1-4 1410A-1416A. The soft delete of entry 2 1404A merely deletes the central header 1412A with the entry still maintained in the blocks as illustrated in FIG. 14B. To recover the entry, the blocks are searched as described above and the central header 2 1412C is merely added back as shown in FIG. 14C. However, when a hard delete is performed, not only is the central header 2 1412 deleted, but the header information for the block itself is deleted and becomes a free block 1404D as shown in FIG. 14D.

Defragment

One consequence of the above described process is that different free blocks may exist in various different locations of the ZIP™ archive. In other words, ZIP™ archive files may have various dead zones with free block segments. The defragment process may be used to compact free blocks into one area. Such a defragmentation process can optimize interior files within an archive without (potentially) rewriting the same archive. Defragment is needed as after many in place editing activities as described above, the physical storage may become divided into many small pieces over time and each small free space is too small to satisfy applications needs. For example a free block with size 4096 bytes might be requested by the application but the largest continuous free block only has a 500 byte block—in this case the free block is completely useless. Defragmentation solves this problem by reorganizing physical storage to move the small free blocks together and combine them into a larger free block. Accordingly, many local file blocks may be moved, along with the data stored in them, and indexing blocks will need to be updated to point to new local file blocks after they are moved.

One special case in defragmentation is to gather and combine free blocks into a large free block, and place this free block at the end of physical file, after the ZIP™ end of central directory record. Different embodiments may elect to truncate the file in which case a fragmentation free, 100% ZIP™ complaint ZIP™ archive will be produced.

Dynamic ZIP32™ to ZIP64™ Switch

As described above, there are two different types of ZIP™ files—ZIP32™ and ZIP64™. One of the differences between the two formats is the maximum archive size. One or more embodiments of the invention automatically (e.g., without additional user input) and dynamically convert/switch the ZIP32™ format to ZIP64™ format to allow/accommodate a large archive file.

The ZIP64™ library may already create the most compatible ZIP™ format automatically (e.g., ZIP32™). However, the ZIP64™ library will not deliberately generate an enhanced ZIP64™ file unless it is actually need to exceed the old format's limitations (e.g., total items exceeding 65535 bytes or a single item exceeding 4 GB). Embodiments of the invention will automatically switch to the ZIP64™ model/format during processing when needed.

For example, during the process of creating a new ZIP™ item, embodiments may determine that there are too many ZIP™ items (>65535), or a single ZIP™ item's compressed size is too big (>4 G). In such a situation, a ZIP64™ package may be automatically created.

Logical Flow

There are various mechanisms for implementing and practicing embodiments of the invention. In this regard, a method, apparatus, and article of manufacture may each enable the ability to perform in-place editing of a ZIP™ archive file in one or more of such embodiments. To perform such editing, a ZIP™ archive file and a first file block (stored in a first block location of the archive file) are both opened. Thereafter, the first file block is modified resulting in a modified first file block.

If the first block location can accommodate the modified first file block, the modified block is stored in the first block location without rewriting the entire ZIP™ archive file. However, if the first block location cannot accommodate the modified first file block, a second file block is copied from a second block location to a third block location located at an end of a file data section of the ZIP™ archive file. Additionally, one or more portions of the second block location are marked as a free block. The process continues by saving the modified first file block without rewriting the archive file in its entirety. Lastly, the archive itself is saved by updating and saving both the central directory and end of central directory record in the ZIP™ archive file.

It can be seen, that if the first file block and the second file block are the same block, the user may enter an append mode thereby copying, moving, and saving the first file block in the third block location. In addition, once moved, the first block location is marked as a free block (in its entirety).

If the first file block and the second file block are different consecutive blocks in the archive, the application may either enter append mode or the reclamation mode. Depending on whether the first block or second block is larger, different actions may ensue. In one embodiment, the first file block is larger and the second file block is moved to the end of the archive and the first file block expands to utilize space of the second file block's prior location. Any portion of the space not used by the expansion is marked as a free block.

Alternatively, as described above, the invention may attempt to move a modified block (e.g., the first or second block, if modified) to an existing free block space. Such a determination would then save the modified block in the free block space (including the respective central directory and end of central directory record) without rewriting the entire ZIP™ archive file.

Once the archive file contains free blocks (or consistent with the invention prior to creating any free blocks), embodiments o the invention may attempt to create a list of free blocks. To create such a list, the first and second file blocks are first loaded. Such a loading performs a backscan of the archive file to load the end of central directory record which is then loaded. Based on the end of central directory record, the central directory is then loaded as well. Thereafter, the first file block and second file block are loaded based on data in the central directory.

The central directory's loading may change depending on whether the archive is in the ZIP32™ format or ZIP64™ format. If in the ZIP32™ format, the central directory may be loaded based on the data in the end of central directory record. However, if the archive is in the ZIP64™ format, the ZIP64™ end of central directory locator is loaded to determine (and read/load) the ZIP64™ end of central directory record location. Thereafter, the central directory can be loaded based on the data in the ZIP64™ end of central directory record.

Embodiments of the invention may further dynamically build a list of free blocks. To build the list, a list of the local file blocks (e.g., the first file block and the second file block) may first be dynamically built based on data in the central directory. Thereafter, an address space of the first file block and the second file block from the central directory is dynamically compared to an address space of the entire ZIP™ archive file. The list of free blocks may be dynamically constructed based on segments missing from the central directory as determined from the address space comparison. The lists of local file blocks may consist of a map of low watermark offsets and high watermarks offsets of the local file blocks. Further, the comparison may look at offsets adjacent to the low watermark offsets and the high watermark offsets to determine if they are in the list of the local file blocks. If they are not in the list of local file blocks, one can assume they are for free blocks. Accordingly, the appropriate adjacent offset may be added to the list of free blocks.

To further enhance in-place editing capability without rewriting an entire archive, a soft delete may also be performed that deletes a file block by deleting a central file header in the central directory corresponding to the deleted file block while leaving the file block itself intact. Such a soft deleted file block may later be recovered by recreating the central file header based on information found in a list of the local file blocks (e.g., a list containing the first file block and second file block). Alternatively, a hard/physical delete may be performed which not only deletes the central file header but also marks the first file block itself as a raw block by burning a signature located at a start offset of the first file block.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide support for the dynamic, in-place growth, allocated space re-use and dynamic ZIP32™/ZIP64™ compliance switching.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for in-place editing of a ZIP™ archive file, comprising:
    (a) opening a ZIP™ archive file;
    (b) opening a first file block that is stored in a first block location of the ZIP™ archive file;
    (c) modifying the first file block resulting in a modified first file block;
    (d) if the first block location can accommodate the modified first file block:
        (1) saving, in-place, the modified first file block in the first block location without rewriting the ZIP™ archive file in its entirety;
        (2) if the first block location cannot accommodate the modified first file block:
    (e) copying a second file block of the ZIP™ archive file from a second block location of the ZIP™ archive file to a third block location located at an end of a file data section of the ZIP™ archive file;
    (f) mark one or more portions of the second block location as a free block; and
    (g) saving the modified first file block without rewriting the ZIP™ archive file in its entirety;
    (h) saving the ZIP™ archive file by:
        (1) updating and saving a central directory of the ZIP™ archive file; and
        (2) updating and saving an end of central directory of the ZIP™ archive file.

2. The method of claim 1 wherein:
    the first file block and the second file block are the same block;
    the modified first file block is saved in the third block location; and
    the first block location is marked as a free block in its entirety.

3. The method of claim 1 wherein:
    the second file block and the first file block are different consecutive blocks of the ZIP™ archive file;
    the first file block is larger than the second file block;
    the modified first file block is saved in the first block location and a portion of the second block location; and
    any portion of the second block location not used by the first file block is marked as a free block.

4. The method of claim 1 further comprising loading the first file block and second file block of the ZIP™ archive file by:
    performing a backscan of the ZIP™ archive file to load an end of central directory record of the ZIP™ archive file;
    loading the central directory based on data in the end of central directory record; and
    load the first file block and second file block based on data in the central directory.

5. The method of claim 4 wherein the loading of the central directory further comprises:
    (a) loading the central directory based on data in the end of central directory record if the ZIP™ archive file is ZIP32™ format;
    (b) if the ZIP™ archive file is ZIP64™ format:

(1) reading a ZIP64™ end of central directory locator of the ZIP™ archive file;
(2) reading a ZIP64™ end of central directory record of the ZIP™ archive file based on data in the ZIP64™ end of central directory locator; and
(3) loading the central directory based on data in the ZIP64™ end of central directory record.

6. The method of claim 1, further comprising building a list of free blocks by:
dynamically building a list of the first file block and the second file block based on data in the central directory;
dynamically comparing an address space of the first file block and the second file block from the central directory to an address space of the entire ZIP™ archive file; and
dynamically building the list of free blocks based on segments missing from the central directory as determined from the address space comparison.

7. The method of claim 6 wherein:
the list of the first file block and the second file block comprises a map of low watermark offsets and high watermarks offsets of the first file block and the second file block;
the comparing comprises determining if offsets adjacent to the low watermark offsets and the high watermark offsets are in the list of the first file block and the second file block; and
building the list of free blocks by adding the offsets adjacent to the low watermark offsets and high watermark offsets if they are not in the list of the first file block and the second file block.

8. The method of claim 1 further comprising:
(a) modifying the second file block resulting in a modified second file block;
(b) moving the modified second file block to the free block;
(c) saving the modified second file block without rewriting the ZIP™ archive file in its entirety; and
(d) saving the ZIP™ archive file without rewriting the ZIP™ archive file in its entirety by:
(1) updating and saving the central directory of the ZIP™ archive file; and
(2) updating and saving the end of central directory of the ZIP™ archive file.

9. The method of claim 1 further comprising soft deleting the first file block by deleting a central file header in the central directory corresponding to the first file block while leaving the first file block intact.

10. The method of claim 9 further comprising recovering the first file block by recreating the central file header based on information found in a list of the first file block and the second file block.

11. The method of claim 1 further comprising hard deleting the first file block by:
deleting a central file header in the central directory corresponding to the first file block; and
marking the first file block as a raw block by burning a signature located at a start offset of the first file block.

12. An apparatus for in-place editing of a ZIP™ archive file in a computer system comprising:
(a) a computer having a memory;
(b) an application executing on the computer, wherein the application is configured to:
(1) opening a ZIP™ archive file;
(2) opening a first file block that is stored in a first block location of the ZIP™ archive file;
(3) modifying the first file block resulting in a modified first file block;
(4) if the first block location can accommodate the modified first file block:
(i) saving, in-place, the modified first file block in the first block location without rewriting the ZIP™ archive file in its entirety;
(ii) if the first block location cannot accommodate the modified first file block:
(5) copying a second file block of the ZIP™ archive file from a second block location of the ZIP™ archive file to a third block location located at an end of a file data section of the ZIP™ archive file;
(6) mark one or more portions of the second block location as a free block; and
(7) saving the modified first file block without rewriting the ZIP™ archive file in its entirety;
(8) saving the ZIP™ archive file by:
(i) updating and saving a central directory of the ZIP™ archive file; and
(ii) updating and saving an end of central directory of the ZIP™ archive file.

13. The apparatus of claim 12 wherein:
the first file block and the second file block are the same block;
the modified first file block is saved in the third block location; and
the first block location is marked as a free block in its entirety.

14. The apparatus of claim 12 wherein:
the second file block and the first file block are different consecutive blocks of the ZIP™ archive file;
the first file block is larger than the second file block;
the modified first file block is saved in the first block location and a portion of the second block location; and
any portion of the second block location not used by the first file block is marked as a free block.

15. The apparatus of claim 12 further comprising loading the first file block and second file block of the ZIP™ archive file by:
performing a backscan of the ZIP™ archive file to load an end of central directory record of the ZIP™ archive file;
loading the central directory based on data in the end of central directory record; and
load the first file block and second file block based on data in the central directory.

16. The apparatus of claim 15 wherein the loading of the central directory further comprises:
(a) loading the central directory based on data in the end of central directory record if the ZIP™ archive file is ZIP32™ format;
(b) if the ZIP™ archive file is ZIP64™ format:
(1) reading a ZIP64™ end of central directory locator of the ZIP™ archive file;
(2) reading a ZIP64™ end of central directory record of the ZIP™ archive file based on data in the ZIP64™ end of central directory locator; and
(3) loading the central directory based on data in the ZIP64™ end of central directory record.

17. The apparatus of claim 12, further comprising building a list of free blocks by:
dynamically building a list of the first file block and the second file block based on data in the central directory;
dynamically comparing an address space of the first file block and the second file block from the central directory to an address space of the entire ZIP™ archive file; and dynamically building the list of free blocks based on segments missing from the central directory as determined from the address space comparison.

18. The apparatus of claim 17 wherein:

the list of the first file block and the second file block comprises a map of low watermark offsets and high watermarks offsets of the first file block and the second file block;

the comparing comprises determining if offsets adjacent to the low watermark offsets and the high watermark offsets are in the list of the first file block and the second file block; and building the list of free blocks by adding the offsets adjacent to the low watermark offsets and high watermark offsets if they are not in the list of the first file block and the second file block.

19. The apparatus of claim 12 further comprising:
(a) modifying the second file block resulting in a modified second file block;
(b) moving the modified second file block to the free block;
(c) saving the modified second file block without rewriting the ZIP™ archive file in its entirety; and
(d) saving the ZIP™ archive file without rewriting the ZIP™ archive file in its entirety by:
 (1) updating and saving the central directory of the ZIP™ archive file; and
 (2) updating and saving the end of central directory of the ZIP™ archive file.

20. The apparatus of claim 12 further comprising soft deleting the first file block by deleting a central file header in the central directory corresponding to the first file block while leaving the first file block intact.

21. The apparatus of claim 20 further comprising recovering the first file block by recreating the central file header based on information found in a list of the first file block and the second file block.

22. The apparatus of claim 12 further comprising hard deleting the first file block by:

deleting a central file header in the central directory corresponding to the first file block; and marking the first file block as a raw block by burning a signature located at a start offset of the first file block.

* * * * *